(12) United States Patent
Chen et al.

(10) Patent No.: US 10,486,399 B2
(45) Date of Patent: *Nov. 26, 2019

(54) THERMOPLASTIC PLANKS AND METHODS FOR MAKING THE SAME

(71) Applicant: Valinge Innovation AB, Viken (SE)

(72) Inventors: Hao A. Chen, Chadds Ford, PA (US); Richard Judd, Newark, NJ (US)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,232

(22) Filed: Apr. 22, 2015

(65) Prior Publication Data
US 2015/0225964 A1     Aug. 13, 2015

Related U.S. Application Data

(60) Continuation of application No. 14/462,951, filed on Aug. 19, 2014, which is a continuation of application
(Continued)

(51) Int. Cl.
*B32B 27/30*     (2006.01)
*E04F 15/10*     (2006.01)
(Continued)

(52) U.S. Cl.
CPC ............ *B32B 27/10* (2013.01); *B29C 48/001* (2019.02); *B29C 48/07* (2019.02); *B29C 48/11* (2019.02);
(Continued)

(58) Field of Classification Search
CPC .................. E04F 15/107; B29C 48/11; Y10T 428/24562; Y10T 428/24661
See application file for complete search history.

(56) References Cited

U.S. PATENT DOCUMENTS

| | | |
|---|---|---|
| 213,740 A | 4/1879 | Connor |
| 792,979 A | 6/1905 | Fulghum |

(Continued)

FOREIGN PATENT DOCUMENTS

| | | |
|---|---|---|
| CA | 1 237 344 | 5/1988 |
| CA | 2 252 791 A1 | 5/1999 |

(Continued)

OTHER PUBLICATIONS

U.S. Appl. No. 14/932,126, Hao A. Chen and Richard Judd, filed Nov. 4, 2015.

(Continued)

*Primary Examiner* — William P Watkins, III
(74) *Attorney, Agent, or Firm* — Buchanan Ingersoll & Rooney P.C.

(57) ABSTRACT

A thermoplastic laminate plank is described wherein the thermoplastic laminate plank includes a core, a print layer, and optionally an overlay. The core includes at least one thermoplastic material and has a top surface and bottom surface wherein a print layer is affixed to the top surface of the core and an overlay layer is affixed to the top surface of the print layer. An underlay layer can be located and affixed between the bottom surface of the print layer and the top surface of the core. In addition, a method of making the thermoplastic laminate plank is further described which involves extruding at least one thermoplastic material into the shape of the core and affixing a laminate on the core, wherein the laminate comprises an overlay affixed to the top surface of the print layer and optionally an underlay layer affixed to the bottom surface of the print layer.

4 Claims, 3 Drawing Sheets

Related U.S. Application Data

No. 13/230,979, filed on Sep. 13, 2011, now Pat. No. 8,834,992, which is a continuation of application No. 12/825,447, filed on Jun. 29, 2010, now Pat. No. 8,021,741, which is a continuation of application No. 12/196,488, filed on Aug. 22, 2008, now Pat. No. 7,763,345, which is a continuation of application No. 11/788,421, filed on Apr. 20, 2007, now Pat. No. 7,419,717, which is a division of application No. 10/104,383, filed on Mar. 22, 2002, now Pat. No. 7,211,310, which is a division of application No. 09/460,928, filed on Dec. 14, 1999, now Pat. No. 6,617,009.

(51) Int. Cl.
*B32B 27/10* (2006.01)
*B29C 48/00* (2019.01)
*B29C 48/07* (2019.01)
*B29C 48/11* (2019.01)
*B29C 48/12* (2019.01)
*B29C 48/30* (2019.01)
*B29C 65/56* (2006.01)
*B29C 65/00* (2006.01)
*B32B 27/06* (2006.01)
*E04F 15/02* (2006.01)
*B32B 3/06* (2006.01)
*B32B 7/12* (2006.01)
*B32B 29/06* (2006.01)
*B32B 5/18* (2006.01)
*B32B 27/08* (2006.01)
*B29C 48/17* (2019.01)
*B29C 48/19* (2019.01)
*B29C 48/20* (2019.01)
*B29C 48/21* (2019.01)
*B29C 59/02* (2006.01)
*B29L 9/00* (2006.01)
*B29L 24/00* (2006.01)
*B29L 31/00* (2006.01)
*B32B 37/15* (2006.01)
*B32B 38/00* (2006.01)

(52) U.S. Cl.
CPC .............. *B29C 48/12* (2019.02); *B29C 48/30* (2019.02); *B29C 48/304* (2019.02); *B29C 65/564* (2013.01); *B29C 66/1142* (2013.01); *B29C 66/43* (2013.01); *B32B 3/06* (2013.01); *B32B 5/18* (2013.01); *B32B 7/12* (2013.01); *B32B 27/06* (2013.01); *B32B 27/08* (2013.01); *B32B 27/30* (2013.01); *B32B 27/304* (2013.01); *B32B 29/06* (2013.01); *E04F 15/02033* (2013.01); *E04F 15/02038* (2013.01); *E04F 15/02172* (2013.01); *E04F 15/10* (2013.01); *E04F 15/107* (2013.01); *B29C 48/17* (2019.02); *B29C 48/19* (2019.02); *B29C 48/20* (2019.02); *B29C 48/21* (2019.02); *B29C 59/02* (2013.01); *B29C 66/30325* (2013.01); *B29C 2795/007* (2013.01); *B29L 2009/00* (2013.01); *B29L 2024/006* (2013.01); *B29L 2031/732* (2013.01); *B32B 37/153* (2013.01); *B32B 38/145* (2013.01); *B32B 2255/10* (2013.01); *B32B 2260/028* (2013.01); *B32B 2260/046* (2013.01); *B32B 2307/31* (2013.01); *B32B 2307/7246* (2013.01); *B32B 2307/7265* (2013.01); *B32B 2419/04* (2013.01); *B32B 2451/00* (2013.01); *B32B 2471/00* (2013.01); *E04F 2201/05* (2013.01); *E04F 2201/0511* (2013.01); *E04F 2201/0529* (2013.01); *E04F 2203/04* (2013.01); *Y10T 428/16* (2015.01); *Y10T 428/162* (2015.01); *Y10T 428/17* (2015.01); *Y10T 428/24008* (2015.01); *Y10T 428/24413* (2015.01); *Y10T 428/24421* (2015.01); *Y10T 428/24562* (2015.01); *Y10T 428/24661* (2015.01); *Y10T 428/24802* (2015.01); *Y10T 428/24851* (2015.01); *Y10T 428/24868* (2015.01); *Y10T 428/24876* (2015.01); *Y10T 428/31866* (2015.04)

(56) References Cited

U.S. PATENT DOCUMENTS

| | | |
|---|---|---|
| 1,018,987 A | 2/1912 | Philpot et al. |
| 1,361,501 A | 12/1920 | Schepmoes |
| 1,394,120 A | 10/1921 | Rockwell |
| 1,723,306 A | 8/1929 | Sipe |
| 1,743,492 A | 1/1930 | Sipe |
| 1,787,027 A | 12/1930 | Wasleff |
| 1,925,070 A | 8/1933 | Livezey |
| 1,946,646 A | 2/1934 | Storm |
| 1,946,690 A | 2/1934 | Haines |
| 2,015,813 A | 10/1935 | Nielsen |
| 2,088,238 A | 7/1937 | Greenway |
| 2,089,075 A | 8/1937 | Siebs |
| 2,142,305 A | 1/1939 | Davis |
| 2,204,675 A | 6/1940 | Grunert |
| 2,266,464 A | 12/1941 | Kraft |
| 2,303,745 A | 12/1942 | Karreman |
| 2,306,295 A | 12/1942 | Casto |
| 2,355,834 A | 8/1944 | Webb |
| 2,497,837 A | 2/1950 | Nelson |
| 2,740,167 A | 4/1956 | Rowley |
| 2,758,044 A | 8/1956 | Terry |
| 2,769,726 A | 11/1956 | Wetterau et al. |
| 2,818,895 A | 1/1958 | Zuber |
| 2,872,712 A | 2/1959 | Brown |
| 2,947,040 A | 8/1960 | Schultz |
| 3,055,461 A | 9/1962 | De Ridder |
| 3,082,488 A | 3/1963 | Nusbaum et al. |
| 3,087,269 A | 4/1963 | Hudson |
| 3,120,083 A | 2/1964 | Dahlberg et al. |
| 3,247,638 A | 4/1966 | Gay et al. |
| 3,259,417 A | 7/1966 | Chapman |
| 3,310,919 A | 3/1967 | Bue et al. |
| 3,397,496 A | 8/1968 | Sohns |
| 3,428,471 A | 2/1969 | Tuthill et al. |
| 3,436,888 A | 4/1969 | Ottosson |
| 3,514,393 A | 5/1970 | Eisby |
| 3,538,665 A | 11/1970 | Gohner |
| 3,554,850 A | 1/1971 | Kuhle |
| 3,578,548 A | 5/1971 | Wesp |
| 3,619,963 A | 11/1971 | Omholt |
| 3,623,288 A | 11/1971 | Horowitz |
| 3,650,549 A | 3/1972 | Pepper |
| 3,657,852 A | 4/1972 | Worthington et al. |
| 3,694,983 A | 10/1972 | Couquet |
| 3,723,220 A | 3/1973 | Scher et al. |
| 3,760,547 A | 9/1973 | Brenneman |
| 3,857,749 A | 12/1974 | Yoshida |
| 3,870,591 A | 3/1975 | Witman et al. |
| 3,879,505 A | 4/1975 | Boutillier et al. |
| 3,883,258 A | 5/1975 | Hewson |
| 3,908,725 A | 9/1975 | Koch |
| 3,924,023 A | 12/1975 | Boranian et al. |
| 3,937,861 A | 2/1976 | Zuckerman et al. |
| 3,946,529 A | 3/1976 | Chevaux |
| 3,950,915 A | 4/1976 | Cole |
| 4,018,957 A | 4/1977 | Werner et al. |
| 4,023,596 A | 5/1977 | Tate |
| 4,037,377 A | 7/1977 | Howell et al. |
| 4,100,710 A | 7/1978 | Kowallik |
| 4,113,909 A | 9/1978 | Beasley |
| 4,136,224 A | 1/1979 | Minami et al. |

(56) References Cited

U.S. PATENT DOCUMENTS

| | | |
|---|---|---|
| 4,164,389 A | 8/1979 | Beasley |
| 4,169,688 A | 10/1979 | Toshio |
| 4,170,859 A | 10/1979 | Counihan |
| 4,176,210 A | 11/1979 | Skinner |
| 4,180,615 A | 12/1979 | Bettoli |
| 4,208,468 A | 6/1980 | Cunningham et al. |
| 4,226,064 A | 10/1980 | Kraayenhof |
| 4,242,390 A | 12/1980 | Nemeth |
| 4,296,017 A | 10/1981 | Weissgerber et al. |
| 4,296,582 A | 10/1981 | Simpson et al. |
| 4,299,070 A | 11/1981 | Oltmanns et al. |
| 4,312,686 A | 1/1982 | Smith et al. |
| 4,315,050 A | 2/1982 | Rourke |
| 4,315,724 A | 2/1982 | Taoka et al. |
| 4,328,152 A | 5/1982 | Tsigdinos et al. |
| 4,329,307 A | 5/1982 | Westcott et al. |
| 4,337,321 A | 6/1982 | Allada |
| 4,393,187 A | 7/1983 | Boba et al. |
| 4,396,566 A | 8/1983 | Brinkmann et al. |
| 4,426,820 A | 1/1984 | Terbrack et al. |
| 4,439,187 A | 3/1984 | Butterfield |
| 4,449,346 A | 5/1984 | Tremblay |
| 4,454,699 A | 6/1984 | Strobl |
| 4,456,643 A | 6/1984 | Colyer |
| 4,457,120 A | 7/1984 | Takata |
| 4,489,115 A | 12/1984 | Layman et al. |
| 4,512,131 A | 4/1985 | Laramore |
| 4,526,418 A | 7/1985 | Martin |
| 4,570,353 A | 2/1986 | Evans |
| 4,571,353 A | 2/1986 | Gable, Jr. |
| 4,574,099 A | 3/1986 | Nixon |
| 4,599,264 A | 7/1986 | Kaufmann et al. |
| 4,599,841 A | 7/1986 | Haid |
| 4,610,900 A | 9/1986 | Nishibori |
| 4,644,720 A | 2/1987 | Schneider |
| 4,689,259 A | 8/1987 | Miller, Jr. et al. |
| 4,698,258 A | 10/1987 | Harkins |
| 4,707,393 A | 11/1987 | Vetter |
| 4,710,415 A | 12/1987 | Slosberg et al. |
| 4,724,187 A | 2/1988 | Ungar et al. |
| 4,759,164 A | 7/1988 | Abendroth et al. |
| 4,769,963 A | 9/1988 | Meyerson |
| 4,788,088 A | 11/1988 | Kohl |
| 4,801,495 A | 1/1989 | Van Der Hoeven |
| 4,807,412 A | 2/1989 | Frederiksen |
| 4,849,768 A | 7/1989 | Graham |
| 4,865,807 A | 9/1989 | Petershofer et al. |
| 4,935,286 A | 6/1990 | Witman |
| 4,940,503 A | 7/1990 | Lindgren et al. |
| 4,944,514 A | 7/1990 | Suiter |
| 4,947,595 A | 8/1990 | Douds et al. |
| 4,976,221 A | 12/1990 | Yetter |
| 5,007,222 A | 4/1991 | Raymond |
| 5,022,200 A | 6/1991 | Wilson et al. |
| 5,050,362 A | 9/1991 | Tal et al. |
| 5,050,653 A | 9/1991 | Brown |
| 5,052,158 A | 10/1991 | D'Luzansky |
| 5,066,531 A | 11/1991 | Legg et al. |
| 5,076,034 A | 12/1991 | Bandy |
| 5,102,716 A * | 4/1992 | Balmer .............. B44C 1/20 428/120 |
| 5,103,614 A | 4/1992 | Kawaguchi et al. |
| 5,112,671 A | 5/1992 | Diamond et al. |
| 5,113,632 A | 5/1992 | Hanson |
| 5,122,212 A | 6/1992 | Ferguson et al. |
| 5,134,026 A | 7/1992 | Melcher |
| 5,158,986 A | 10/1992 | Cha et al. |
| 5,162,141 A | 11/1992 | Davey et al. |
| 5,183,438 A | 2/1993 | Blom |
| 5,185,193 A | 2/1993 | Phenicie et al. |
| 5,187,501 A * | 2/1993 | Lewicki, Jr. ......... G03G 5/0202 347/112 |
| 5,229,217 A | 7/1993 | Holzer |
| 5,277,852 A | 1/1994 | Spydevold |
| 5,295,341 A | 3/1994 | Kajiwara |
| 5,303,526 A | 4/1994 | Niese |
| 5,322,335 A | 6/1994 | Niemi |
| 5,333,429 A | 8/1994 | Cretti |
| 5,349,796 A | 9/1994 | Meyerson |
| 5,367,844 A | 11/1994 | Diedrich |
| 5,425,986 A | 6/1995 | Guyette |
| 5,433,806 A | 7/1995 | Pasquali et al. |
| 5,458,953 A | 10/1995 | Wang et al. |
| 5,475,952 A * | 12/1995 | O'Connor .............. B32B 3/26 428/163 |
| 5,480,602 A | 1/1996 | Nagaich |
| 5,494,707 A | 2/1996 | Wang et al. |
| 5,502,939 A | 4/1996 | Zadok |
| 5,503,788 A | 4/1996 | Lazareck et al. |
| 5,516,472 A | 5/1996 | Laver |
| 5,547,741 A | 8/1996 | Wilson |
| 5,553,427 A | 9/1996 | Andres |
| 5,595,625 A | 1/1997 | Fishel et al. |
| 5,613,339 A * | 3/1997 | Pollock .............. B63B 3/48 52/836 |
| 5,618,602 A | 4/1997 | Nelson |
| 5,627,231 A | 5/1997 | Shalov et al. |
| 5,642,592 A | 7/1997 | Andres |
| 5,643,677 A | 7/1997 | Feifer et al. |
| 5,647,184 A | 7/1997 | Davis |
| 5,653,099 A | 8/1997 | Mackenzie |
| 5,660,016 A | 8/1997 | Erwin et al. |
| 5,662,977 A | 9/1997 | Spain et al. |
| 5,670,237 A | 9/1997 | Shultz et al. |
| 5,671,575 A | 9/1997 | Wu |
| 5,681,652 A | 10/1997 | Cope |
| 5,694,730 A | 12/1997 | Del Rincon et al. |
| 5,706,621 A | 1/1998 | Pervan |
| 5,713,165 A | 2/1998 | Erwin |
| 5,719,227 A | 2/1998 | Rosenberry et al. |
| 5,724,909 A | 3/1998 | Pitman et al. |
| 5,728,476 A | 3/1998 | Harwood |
| 5,747,133 A | 5/1998 | Vinod et al. |
| 5,755,068 A | 5/1998 | Ormiston |
| 5,758,466 A | 6/1998 | Tucker |
| 5,777,014 A | 7/1998 | Hopper et al. |
| 5,780,147 A | 7/1998 | Sugahara et al. |
| 5,791,113 A | 8/1998 | Glowa et al. |
| 5,791,114 A | 8/1998 | Mandel |
| 5,797,237 A | 8/1998 | Finkell, Jr. |
| 5,824,415 A | 10/1998 | Kanki et al. |
| 5,830,937 A | 11/1998 | Shalov et al. |
| 5,833,386 A | 11/1998 | Rosan et al. |
| 5,834,081 A | 11/1998 | Fanti |
| 5,836,128 A | 11/1998 | Groh et al. |
| 5,856,389 A | 1/1999 | Kostrzewski et al. |
| 5,858,160 A | 1/1999 | Piacente |
| 5,863,632 A | 1/1999 | Bisker |
| 5,869,138 A | 2/1999 | Nishibori |
| D406,360 S | 3/1999 | Finkell, Jr. |
| 5,900,099 A | 5/1999 | Sweet |
| 5,901,510 A | 5/1999 | Ellingson |
| 5,965,232 A | 10/1999 | Vinod |
| 5,968,630 A | 10/1999 | Foster |
| 5,985,429 A | 11/1999 | Plummer et al. |
| 5,989,668 A | 11/1999 | Nelson et al. |
| 6,004,417 A | 12/1999 | Roesch et al. |
| 6,006,486 A | 12/1999 | Moriau et al. |
| 6,023,907 A | 2/2000 | Pervan |
| 6,027,599 A | 2/2000 | Wang |
| 6,029,416 A | 2/2000 | Anderson |
| 6,093,473 A * | 7/2000 | Min .............. B32B 27/10 428/147 |
| 6,101,778 A | 8/2000 | Mårtensson |
| 6,103,044 A | 8/2000 | Harwood et al. |
| 6,139,945 A | 10/2000 | Krejchi et al. |
| 6,173,548 B1 | 1/2001 | Hamar et al. |
| 6,189,282 B1 | 2/2001 | Vanderwerf |
| 6,228,463 B1 | 5/2001 | Chen et al. |
| 6,233,899 B1 | 5/2001 | Mellert et al. |
| 6,250,040 B1 | 6/2001 | Green |
| 6,260,326 B1 | 7/2001 | Muller-Hartburg |
| 6,314,701 B1 | 11/2001 | Meyerson |
| 6,324,809 B1 | 12/2001 | Nelson |

(56) References Cited

U.S. PATENT DOCUMENTS

| | | |
|---|---|---|
| 6,333,076 B1 | 12/2001 | Sigel et al. |
| 6,345,481 B1 | 2/2002 | Nelson |
| 6,348,268 B1 | 2/2002 | Donnelly et al. |
| 6,397,547 B1 | 6/2002 | Martensson |
| 6,421,970 B1 | 7/2002 | Mårtensson et al. |
| 6,436,159 B1 | 8/2002 | Safta et al. |
| 6,438,919 B1 | 8/2002 | Knauseder |
| 6,449,918 B1 | 9/2002 | Nelson |
| 6,455,127 B1 | 9/2002 | Valtanen |
| 6,460,306 B1 | 10/2002 | Nelson |
| 6,558,070 B1 | 5/2003 | Valtanen |
| 6,617,009 B1 | 9/2003 | Chen et al. |
| 6,641,926 B1 | 11/2003 | Malina |
| 6,647,690 B1 | 11/2003 | Martensson |
| 6,675,545 B2 | 1/2004 | Chen et al. |
| 6,753,066 B2 | 6/2004 | Eby et al. |
| 6,761,008 B2 | 7/2004 | Chen et al. |
| 6,766,622 B1 | 7/2004 | Thiers |
| 6,835,421 B1 | 12/2004 | Dohring |
| 6,851,237 B2 | 2/2005 | Niese et al. |
| 6,854,235 B2 | 2/2005 | Martensson |
| 6,874,292 B2 | 4/2005 | Moriau |
| 6,880,305 B2 | 4/2005 | Pervan et al. |
| 6,898,911 B2 | 5/2005 | Kornfalt et al. |
| 6,920,732 B2 | 7/2005 | Mårtensson |
| 6,922,964 B2 | 8/2005 | Pervan |
| 6,955,020 B2 | 10/2005 | Moriau et al. |
| 6,986,934 B2 | 1/2006 | Chen et al. |
| 7,086,205 B2 | 8/2006 | Pervan |
| 7,169,460 B1 | 1/2007 | Chen et al. |
| 7,211,310 B2 | 5/2007 | Chen et al. |
| 7,328,536 B2 | 2/2008 | Moriau et al. |
| 7,386,963 B2 | 6/2008 | Pervan |
| 7,419,717 B2 | 9/2008 | Chen et al. |
| 7,568,322 B2 | 8/2009 | Pervan et al. |
| 7,584,583 B2 | 9/2009 | Bergelin et al. |
| 7,763,345 B2 | 7/2010 | Chen et al. |
| 7,770,350 B2 | 8/2010 | Moriau et al. |
| 7,802,415 B2 | 9/2010 | Pervan |
| 7,856,784 B2 | 12/2010 | Martensson |
| 7,886,497 B2 | 2/2011 | Pervan et al. |
| 7,930,862 B2 | 4/2011 | Bergelin et al. |
| 8,006,460 B2 | 8/2011 | Chen et al. |
| 8,021,741 B2 | 9/2011 | Chen et al. |
| 8,028,486 B2 | 10/2011 | Pervan |
| 8,112,891 B2 | 2/2012 | Pervan |
| 8,245,478 B2 | 8/2012 | Bergelin et al. |
| 8,293,058 B2 | 10/2012 | Pervan et al. |
| 8,365,499 B2 | 2/2013 | Nilsson et al. |
| 8,480,841 B2 | 7/2013 | Pervan et al. |
| 8,511,031 B2 | 8/2013 | Bergelin et al. |
| 8,584,423 B2 | 11/2013 | Pervan et al. |
| 8,613,826 B2 | 12/2013 | Pervan et al. |
| 8,658,274 B2 | 2/2014 | Chen et al. |
| 8,756,899 B2 | 6/2014 | Pervan et al. |
| 8,800,150 B2 | 8/2014 | Pervan |
| 8,833,028 B2 | 9/2014 | Whispell et al. |
| 8,834,992 B2 | 9/2014 | Chen et al. |
| 8,875,465 B2 | 11/2014 | Martensson |
| 9,156,233 B2 | 10/2015 | Dossche et al. |
| 9,193,137 B2 | 11/2015 | Dossche et al. |
| 9,222,267 B2 | 12/2015 | Bergelin et al. |
| 9,234,357 B2 | 1/2016 | Dossche et al. |
| 9,249,581 B2 | 2/2016 | Nilsson et al. |
| 9,296,191 B2 | 3/2016 | Pervan et al. |
| 9,314,936 B2 | 4/2016 | Pervan |
| 9,315,994 B2 | 4/2016 | Chen et al. |
| 9,410,328 B2 | 8/2016 | Pervan |
| 9,695,601 B2 | 7/2017 | Whispell et al. |
| 9,714,515 B2 | 7/2017 | Pervan |
| 9,765,530 B2 | 9/2017 | Bergelin et al. |
| 10,047,527 B2 | 8/2018 | Nilsson et al. |
| 10,059,084 B2 | 8/2018 | Lundblad et al. |
| 10,137,659 B2 | 11/2018 | Pervan |
| 10,287,777 B2 | 5/2019 | Boo |
| 10,301,830 B2 | 5/2019 | Boo |
| 2001/0021431 A1 | 9/2001 | Chen |
| 2001/0036557 A1 | 11/2001 | Ingrim et al. |
| 2002/0025446 A1 | 2/2002 | Chen et al. |
| 2002/0031646 A1 | 3/2002 | Chen |
| 2002/0046527 A1 | 4/2002 | Nelson |
| 2002/0095894 A1 | 7/2002 | Pervan |
| 2002/0112429 A1 | 8/2002 | Niese et al. |
| 2002/0142135 A1 | 10/2002 | Chen et al. |
| 2002/0178674 A1 | 12/2002 | Pervan |
| 2002/0178681 A1 | 12/2002 | Zancai |
| 2003/0024199 A1 | 2/2003 | Pervan |
| 2003/0024200 A1 | 2/2003 | Moriau et al. |
| 2003/0196397 A1 | 10/2003 | Niese et al. |
| 2003/0196405 A1 | 10/2003 | Pervan |
| 2004/0003888 A1 | 1/2004 | Mott et al. |
| 2004/0068954 A1 | 4/2004 | Martensson |
| 2004/0107659 A1 | 6/2004 | Glockl |
| 2004/0206036 A1 | 10/2004 | Pervan |
| 2005/0003160 A1 | 1/2005 | Chen et al. |
| 2005/0166502 A1 | 8/2005 | Pervan |
| 2005/0210810 A1 | 9/2005 | Pervan |
| 2006/0032175 A1 | 2/2006 | Chen et al. |
| 2006/0283127 A1 | 12/2006 | Pervan |
| 2007/0175148 A1 | 8/2007 | Bergelin et al. |
| 2007/0196624 A1 | 8/2007 | Chen et al. |
| 2008/0000182 A1 | 1/2008 | Pervan |
| 2008/0000183 A1 | 1/2008 | Bergelin et al. |
| 2008/0000188 A1 | 1/2008 | Pervan |
| 2008/0005992 A1 | 1/2008 | Pervan |
| 2008/0028707 A1 | 2/2008 | Pervan |
| 2008/0063844 A1 | 3/2008 | Chen et al. |
| 2008/0168737 A1 | 7/2008 | Pervan |
| 2008/0172971 A1 | 7/2008 | Pervan |
| 2008/0256890 A1 | 10/2008 | Pervan |
| 2008/0311355 A1 | 12/2008 | Chen et al. |
| 2010/0260962 A1 | 10/2010 | Chen et al. |
| 2011/0041996 A1 | 2/2011 | Pervan |
| 2011/0056167 A1 | 3/2011 | Nilsson et al. |
| 2011/0131901 A1 | 6/2011 | Pervan et al. |
| 2011/0154665 A1 | 6/2011 | Pervan |
| 2011/0154763 A1 | 6/2011 | Bergelin et al. |
| 2011/0167744 A1 | 7/2011 | Whispell et al. |
| 2011/0247748 A1 | 10/2011 | Pervan et al. |
| 2012/0003439 A1 | 1/2012 | Chen et al. |
| 2012/0040149 A1 | 2/2012 | Chen et al. |
| 2012/0137617 A1 | 6/2012 | Pervan |
| 2012/0216472 A1 | 8/2012 | Martensson |
| 2012/0279154 A1 | 11/2012 | Bergelin et al. |
| 2013/0014890 A1 | 1/2013 | Pervan et al. |
| 2013/0047536 A1 | 2/2013 | Pervan |
| 2013/0111758 A1 | 5/2013 | Nilsson et al. |
| 2013/0269863 A1 | 10/2013 | Pervan et al. |
| 2013/0298487 A1 | 11/2013 | Bergelin et al. |
| 2014/0020325 A1 | 1/2014 | Pervan |
| 2014/0033635 A1 | 2/2014 | Pervan et al. |
| 2014/0109507 A1 | 4/2014 | Dossche et al. |
| 2014/0115994 A1 | 5/2014 | Pervan |
| 2014/0166201 A1 | 6/2014 | Pervan |
| 2014/0237924 A1 | 8/2014 | Nilsson et al. |
| 2014/0283466 A1 | 9/2014 | Boo |
| 2014/0318061 A1 | 10/2014 | Pervan |
| 2014/0352248 A1 | 12/2014 | Whispell et al. |
| 2014/0356594 A1 | 12/2014 | Chen et al. |
| 2015/0072102 A1 | 3/2015 | Dossche et al. |
| 2015/0075105 A1 | 3/2015 | Engstrom |
| 2015/0337543 A1 | 11/2015 | Dossche et al. |
| 2016/0016390 A1 | 1/2016 | Lundblad et al. |
| 2016/0016391 A1 | 1/2016 | Lundblad et al. |
| 2016/0052245 A1 | 2/2016 | Chen et al. |
| 2016/0069089 A1 | 3/2016 | Bergelin et al. |
| 2016/0108624 A1 | 4/2016 | Nilsson et al. |
| 2016/0186318 A1 | 6/2016 | Pervan et al. |
| 2016/0194883 A1 | 7/2016 | Pervan |
| 2016/0194885 A1 | 7/2016 | Whispell et al. |
| 2016/0201324 A1 | 7/2016 | Håkansson et al. |
| 2017/0037642 A1 | 2/2017 | Boo |
| 2017/0037645 A1 | 2/2017 | Pervan |
| 2017/0175400 A1 | 6/2017 | Joseffson et al. |

(56) References Cited

U.S. PATENT DOCUMENTS

| | | | |
|---|---|---|---|
| 2017/0241136 A1 | 8/2017 | Kell | |
| 2017/0350140 A1 | 12/2017 | Bergelin et al. | |
| 2018/0094441 A1 | 4/2018 | Boo | |
| 2018/0313093 A1 | 11/2018 | Nilsson et al. | |
| 2019/0091977 A1 | 3/2019 | Lundblad et al. | |

FOREIGN PATENT DOCUMENTS

| | | |
|---|---|---|
| CA | 2 252 791 C | 5/2004 |
| CN | 2076142 U | 5/1991 |
| CN | 2106197 U | 6/1992 |
| CN | 2124276 U | 12/1992 |
| CN | 2272915 | 1/1998 |
| CN | 2301491 | 12/1998 |
| DE | 1 081 653 | 5/1960 |
| DE | 1 534 802 | 2/1970 |
| DE | 28 24 656 A1 | 1/1979 |
| DE | R 134 967 | 4/1979 |
| DE | 28 32 817 A1 | 2/1980 |
| DE | 28 35 924 A1 | 2/1980 |
| DE | 3 150 352 A1 | 10/1982 |
| DE | 3 135 716 A1 | 6/1983 |
| DE | 33 43 601 A1 | 12/1983 |
| DE | 35 38 538 A1 | 5/1987 |
| DE | 39 04 686 C1 | 8/1989 |
| DE | 39 32 980 A1 | 11/1991 |
| DE | 40 20 682 A1 | 1/1992 |
| DE | 94 01 365 U1 | 3/1994 |
| DE | 42 42 530 A1 | 6/1994 |
| DE | 295 17 995 U1 | 3/1996 |
| DE | 198 54 475 A1 | 7/1999 |
| DE | 299 08 733 U1 | 8/1999 |
| DE | 298 23 681 U1 | 12/1999 |
| DE | 299 14 604 U1 | 1/2001 |
| EP | 0 040 443 A2 | 11/1981 |
| EP | 0 046 526 A2 | 3/1982 |
| EP | 0 085 196 A1 | 8/1983 |
| EP | 0 548 767 A1 | 6/1993 |
| EP | 0 562 402 A1 | 9/1993 |
| EP | 0 592 013 A2 | 4/1994 |
| EP | 0 665 347 A1 | 8/1995 |
| EP | 0 698 126 | 2/1996 |
| EP | 0 843 763 A1 | 5/1998 |
| EP | 0 890 373 A1 | 1/1999 |
| EP | 0 893 473 A1 | 1/1999 |
| EP | 0 903 451 A2 | 3/1999 |
| EP | 0 919 367 A2 | 6/1999 |
| EP | 0 903 451 A3 | 8/1999 |
| FR | 1 293 043 A | 5/1962 |
| FR | 2 278 876 A1 | 2/1976 |
| FR | 2 445 875 A1 | 1/1980 |
| FR | 2 498 666 A1 | 7/1982 |
| FR | 2 557 905 | 7/1985 |
| GB | 25 180 | 7/1907 |
| GB | 484 750 | 5/1938 |
| GB | 518 239 A | 2/1940 |
| GB | 875 327 | 8/1961 |
| GB | 900 958 | 7/1962 |
| GB | 1 189 485 | 4/1970 |
| GB | 1 308 011 | 2/1973 |
| GB | 1 430 423 | 3/1976 |
| GB | 1 430 423 A | 3/1976 |
| GB | 1 520 964 | 8/1978 |
| GB | 1 520 964 A | 8/1978 |
| GB | 2 020 998 A | 11/1979 |
| GB | 2 029 393 A | 3/1980 |
| GB | 2 095 814 A | 10/1982 |
| GB | 2 117 813 A | 10/1983 |
| GB | 2 145 371 A | 3/1985 |
| GB | 2 147 856 A | 5/1985 |
| GB | 2 243 381 A | 10/1991 |
| GB | 2 256 023 A | 11/1992 |
| GB | 2 264 453 A | 9/1993 |
| GB | 2 264 453 B | 12/1995 |
| JP | 56-104936 U | 1/1981 |
| JP | 56-131752 A | 10/1981 |
| JP | 57-119056 | 7/1982 |
| JP | 57-157636 U | 10/1982 |
| JP | 59-185346 U | 12/1984 |
| JP | 60-255843 A | 12/1985 |
| JP | 60-255843 A2 | 12/1985 |
| JP | 62-127225 | 6/1987 |
| JP | 1-178659 A | 7/1989 |
| JP | 1-202403 A | 8/1989 |
| JP | 1-33702 Y2 | 10/1989 |
| JP | 3-169967 | 7/1991 |
| JP | H05-169534 A | 7/1993 |
| JP | 5-96282 U | 12/1993 |
| JP | 05-318674 A | 12/1993 |
| JP | 06-064108 | 3/1994 |
| JP | 6-39840 B2 | 5/1994 |
| JP | 06-315944 | 11/1994 |
| JP | 7-26467 U | 5/1995 |
| JP | 7-180333 A | 7/1995 |
| JP | H7-180333 | 7/1995 |
| JP | 8-086080 A | 4/1996 |
| JP | 8-109734 A | 4/1996 |
| JP | 9-053319 A | 2/1997 |
| JP | 09-254697 | 9/1997 |
| JP | 10-002096 A | 1/1998 |
| JP | H10-102743 A | 4/1998 |
| JP | 10-219975 A | 8/1998 |
| JP | 11-131771 A | 5/1999 |
| JP | 11-268010 A | 10/1999 |
| KR | 1996-0005785 | 7/1996 |
| RU | 2081135 C1 | 6/1997 |
| SE | 506 254 C2 | 11/1997 |
| WO | WO 82/00021 A1 | 1/1982 |
| WO | WO 88/01934 A1 | 3/1988 |
| WO | WO 89/03753 A1 | 5/1989 |
| WO | WO 90/06232 A1 | 6/1990 |
| WO | WO 93/13169 A1 | 7/1993 |
| WO | WO 94/01628 A2 | 1/1994 |
| WO | WO 94/17996 A1 | 8/1994 |
| WO | WO 94/21721 A1 | 9/1994 |
| WO | WO 94/26999 A1 | 11/1994 |
| WO | WO 94/28183 | 12/1994 |
| WO | WO 95/11333 | 4/1995 |
| WO | WO 95/17568 A1 | 6/1995 |
| WO | WO 96/04441 A1 | 2/1996 |
| WO | WO 96/06248 A1 | 2/1996 |
| WO | WO 96/07801 A1 | 3/1996 |
| WO | WO 96/09262 A1 | 3/1996 |
| WO | WO 96/27721 A1 | 9/1996 |
| WO | WO 97/10396 | 3/1997 |
| WO | WO 97/18949 A1 | 5/1997 |
| WO | WO 97/21011 | 6/1997 |
| WO | WO 97/47834 A1 | 12/1997 |
| WO | WO 98/24995 A1 | 6/1998 |
| WO | WO 98/38401 A1 | 9/1998 |
| WO | WO 98/44187 A1 | 10/1998 |
| WO | WO 98/58142 A1 | 12/1998 |
| WO | WO 99/17930 A1 | 4/1999 |
| WO | WO 99/28767 A1 | 6/1999 |
| WO | WO 99/39042 A1 | 8/1999 |
| WO | WO 99/58254 A1 | 11/1999 |
| WO | WO 99/66151 A1 | 12/1999 |
| WO | WO 99/66152 A1 | 12/1999 |
| WO | WO 00/15919 A1 | 3/2000 |
| WO | WO 00/17467 A1 | 3/2000 |
| WO | WO 00/20705 A1 | 4/2000 |
| WO | WO 00/22225 A1 | 4/2000 |
| WO | WO 00/44984 A1 | 8/2000 |
| WO | WO 00/47841 A1 | 8/2000 |
| WO | WO 00/66856 A1 | 11/2000 |
| WO | WO 01/45915 A1 | 6/2001 |

OTHER PUBLICATIONS

U.S. Appl. No. 14/946,080, Marcus Bergelin and Mats Nilsson, filed Nov. 19, 2015.

(56) References Cited

OTHER PUBLICATIONS

Chen, Hao A , et al., U.S. Appl. No. 14/932,126 entitled "Thermoplastic Planks and Methods for Making the Same," filed Nov. 4, 2015.
Bergelin, Marcus, et al., U.S. Appl. No. 14/946,080 entitled "Resilient Groove." filed Nov. 19, 2015.
U.S. Appl. No. 13/943,464, Marcus Bergelin and Mats Nilsson, filed Jul. 16, 2013.
U.S. Appl. No. 14/050,597, Darko Pervan and Tony Pervan, filed Oct. 10, 2013 (cited herein as US Patent Application Publication No. 2014/0033635 A1 of Feb. 6, 2014).
U.S. Appl. No. 14/272,895, Mats Nilsson and Per Nygren, filed May 8, 2014 (Cited herein as US Patent Application Publication No. 2014/0237924 A1 of Aug. 28, 2014).
U.S. Appl. No. 14/462,951, Hao A. Chen and Richard Judd, filed Aug. 19, 2014 (Cited herein as US Patent Application Publication No. 2014/0356594 A1 of Dec. 4, 2014).
Composite Panel Report: Laminate Flooring, "Wood Digest" Sep. 1999, pp. 37.
European Search Report dated Mar. 6, 2002.
Official Communication form European Patent Office for EP 00 127 179.0 dated Mar. 21, 2007.
Wilkes, et al.., "Table 5.3 Typical properties of General Purpose Vinyl Plastic Products," PVC Handbook, ISBN 3-446-22714-8, 1988, p. 184.
"Reference: Polymer Properties," Polymer Products from Aldrich, dated 1993, (2 pages).
PVC Resin-Solution Viscosity-K Value Chart (1 page).
Notice of Opposition to a European Patent dated Feb. 29, 2012, filed with the European Patent Office in related European Patent No. 1108529 (EP Patent Application No. 00127179.0) (23 pages).
Notice of Opposition to a European Patent dated Nov. 6, 2013, filed with the European Patent Office in related European Patent No. 2248665 (EP Patent Application No. 10007691.8) (22 pages).
Communication from European Patent Office dated Oct. 29, 2013 with Letter from Opponent dated Oct. 24, 2013 in related European Patent No. 1108529 (EP Patent Application No. 00127179.0) (11 pages).
Laminatfußböden, Technik und Technologien, Laminatforum, 1999, pp. 23-24.
Mobil oil/Holzwerkstoff-Symposium, Stuttgart 1998, Volker Kettler, Witex AG, pp. 1-24.
Ullmann's Encyclopedia of Industrial Chemistry, 1996, vol. A28, pp. 345-350.
Holzwerkstoffe, Herstellung und Verarbeitung; Platten, Beschichtungsstoffe, Formteile, Türen, Möbel; Von Hansgert Soiné; DRW-Verlag, 1995 (51 pages).
Summons to attend oral proceedings pursuant to Rule 115(1) EPC from European Patent Office dated Nov. 5, 2013 in related European Patent No. 1108529 (EP Patent Application No. 00127179.0 (13 pages).
International Search Report issued in PCT/US00/42812, dated Oct. 8, 2001, 3 pages, European Patent Office, Rijswijk, NL.
U.S. Appl. No. 14/790,774, Christer Lundblad, Niclas Håkansson and Göran Ziegler, filed Jul. 2, 2015.
U.S. Appl. No. 14/790,850, Christer Lundblad, Niclas Håkansson and Göran Ziegler, filed Jul. 2, 2015.
Lundblad, Christer, et al., U.S. Appl. No. 14/790,774 entitled "Method to Produce a Thermoplastic Wear Resistant Foil," filed Jul. 2, 2015.
Lundblad, Christer, et al., U.S. Appl. No. 14/790,850 entitled "Method to Produce a Thermoplastic Wear Resistant Foil," filed Jul. 2, 2015.
Third Party Observation submitted by Patentwerk B.V to the European Patent Office in EP 2 248 665 (Application No. 10007691. 8), Oct. 15, 2015, 22 pages.
ASTM, Designation: F 1700-96, "Standard Specification for Solid Vinyl Floor Tile," Jul. 1996, pp. 719-721, ASTM International, West Conshohocken, PA, USA.
Azrock Brochure, "Luxury Vinyl Tile," Apr. 1998, 1 page, Azrock, USA.
Nass, Leonard I., Ed., Encyclopedia of PVC, vol. 1, 1976, 4 pages, Marcel Dekker, Inc., NY, NY.
"Plasticizer," retrieved Feb. 29, 2012, from Wikipedia (6 pages).
"Polyvinyl chloride," retrieved Feb. 29, 2012, from Wikipedia (13 pages).
Excerpt from Bodenwanddecke, "USA: Das sind die Trends," Apr. 2000, p. 7.
Second Amended Complaint, *Välinge Innovation AB* v. *Halstead New England Corp., Halstead International; Home Depot U.S.A., Inc.; and The Home Depot, Inc.*, United States District Court for the District of Delaware, C.A. No. 16-1082-LPS-CJB, dated Mar. 28, 2017, 55 pages.
Complaint, *Välinge Innovation AB* v. *Halstead New England Corp. and The Home Depot, Inc.*, United States District Court for the District of Delaware, Case No. 1-16-cv-01082, dated Nov. 23, 2016, 14 pages.
Interlocutory Decision and Minutes, Jan. 25, 2016, EP Application No. 10 007 691.8 (Pat No. EP 2 248 665 B1), European Patent Office, Rijwsjik, NL (95 pages).
Decision Rejecting the Opposition, Oct. 29, 2014, EP Application No. 00 127 179.0 (Pat No. EP 1 108 529 A2), European Patent Office, Munich, DE (25 pages).
Caseri, Walter, Ed., "Overlays", Römpp Lexikon Chemie, Last Update; Apr. 2007, Georg Thieme Verlag KG, DE (1 page).
U.S. Appl. No. 15/684,129, Marcus Bergelin and Mats Nilsson, filed Aug. 23, 2017.
European Search Report in EP 00 12 7179, dated Feb. 22, 2002, European Patent Office, Rijswijk, NL, 3 pages.
Extended European Search Report issued in EP10007691.8, filed Oct. 7, 2010, European Patent Office, Rijswijk, NL, 4 pages.
Bergelin, Marcus, et al., U.S. Appl. No. 15/684,129 entitled "Floorboards Comprising a Decorative Edge Part in a Resilient Surface Layer," filed Aug. 23, 2017.
Plaintiff's Opening Claim Construction Brief, *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 38 pages (Document 86).
Declaration of Pilar G. Kraman in Support of Plaintiff's Opening Claim Construction Brief, with Exhibits 1-6, *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 65 pages (Document 87, 87-1, 87-2).
Declaration of Steven B. Maclean in Support of Plaintiff's Opening Claim Construction Brief, with Exhibits 1-2, *Välinge Innovation AB* v. *Halstead New England Corp. and Home Depot U.S.A., Inc.*, United States District Court for the District of Delaware, C.A. No. 16-1082-LPS-CJB. dated Dec. 11, 2017, 23 pages (Document 88, 88-1, 88-2).
Defendants Halstead New England Corp. and Home Depot U.S.A., Inc.'S Opening Claim Construction Brief, *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 36 pages (Document 89).
Declaration of Robert M Kimmel, Sc.D. on Claim Construction, with Exhibits A-Q, *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 153 pages (Document 90, 90-1, 90-2).
Declaration of Richard T. Kaczkowski, with Exhibits A-D, *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 48 pages (Document 91, 91-1).
Exhibits 1-17 (re Document 89), *Välinge Innovation AB* v. *Halstead New England Corp. and Home Depot U.S.A., Inc.*, United States District Court for the District of Delaware, C.A. No. 16-1082-LPS-CJB, dated Dec. 11, 2017, 381 pages (Document 92, 92-1).
Plaintiff's Responsive Claim Construction Brief, *Välinge Innovation AB* v. *Halstead New England Corp. and Home Depot U.S.A., Inc.*,

(56) References Cited

OTHER PUBLICATIONS

United States District Court for the District of Delaware, C.A. No. 16-1082-LPS-CJB, dated Jan. 16, 2018, 29 pages (Document 98).
Declaration of Pilar G. Kraman in Support of Plaintiff's Responsive Claim Construction Brief, with Exhibits 1-15, *Välinge Innovation AB* v. *Halstead New England Corp. and Home Depot U.S.A., Inc.*, United States District Court for the District of Delaware, C.A. No. 16-1082-LBS-CJB, dated Jan. 16, 2018, 105 pages (Document 99, 99-1).
Declaration of Steven B. Maclean in Support of Plaintiff's Responsive Claim Construction Brief, *Välinge Innovation AB* v. *Halstead New England Corp. and Home Depot U.S.A., Inc.*, United States District Court for the District of Delaware, C.A. No. 16-1082-LPS-CJB, dated Jan. 16, 2018, 25 pages (Document 100).
Defendants Halstead New England Corp. and Home Depot U.S.A., Inc.'s Responsive Claim Construction Brief, *Välinge Innovation AB* v. *Halstead New England Corp. and Home Depot U.S.A., Inc.*, United States District Court for the District of Delaware, C.A. No. 16-1082-LPS-CJB, dated Jan. 16, 2018, 26 pages (Document 102, 102-1).
Declaration of Brian A. Biggs in Support of Defendants Halstead New England Corp. and Home Depot U.S.A., Inc.'s Responsive Claim Construction Brief, with Exhibit 1, *Välinge Innovation AB* v. *Halstead New England Corp. and Home Depot U.S.A., Inc.*, United States District Court for the District of Delaware, C.A. No. 16-1082-LPS-CJB, dated Jan. 16, 2018, 6 pages (Document 103, 103-1, 103-2).
Supplemental Declaration of Robert M. Kimmel, Sc.D. on Claim Construction, with Exhibits A-J, *Välinge Innovation AB* v. *Halstead New England Corp. and Home Depot U.S.A., Inc.*, United States District Court for the District of Delaware, C.A. No. 16-1082-LPS-CJB, dated Jan. 16, 2018, 69 pages (Document 104, 104-1, 104-2).
Carpet & Floorcoverings Review, Feb. 1999, CMP Information Ltd., London, England, UK, 8 pages.
ASTM International, Designation: D 2124-99, "Standard Test Method for Analysis of Components in Poly(Vinyl Chloride) Compounds Using an Infrared Spectrophotometric Technique," Sep. 1999, pp. 1-5 and Summary of Changes—Apr. 2002, ASTM International, West Conshohocken, PA, USA.
Ellison, A.H., et al., "Wettability of Halogenated Organic Solid Surfaces," Journal of Physical Chemistry, Mar. 1954, pp. 260-265, vol. 58 (3), American Chemical Society, USA.
Haslam, J., et al., "The Examination of Polyvinyl Chloride Compositions Containing Polypropylene Adipate," Analyst Journal, Dec. 1955, pp. 871-874, vol. 80, No. 957, W. Heffer & Sons, Ltd., Cambridge, England, UK.
Jańczuk, Bronislaw, et al., "The Components of Surface Tension of Liquids and Their Usefulness in Determinations of Surface Free Energy of Solids," Journal of Colloid and Interface Science, Jan. 1989, pp. 59-66, vol. 127, No. 1, Academic Press Inc., Cambridge, MA, USA.
Jańczuk, Bronislaw, et al., "Adhesion of Air Bubbles to Teflon Surfaces in Water" Journal of Colloid and Interface Science, Mar. 1, 1989, pp. 1-6, vol. 128, No. 1, Academic Press, Inc., Cambridge, MA, USA.
Lapčik, L., et al., "Kinetic study of dissolution of poly(vinyl chloride) in tetrahydrofuran, cyclohexanone, cyclopentanone, and N,N-dimethylformamide," Chemicke Zvesti, 1973, pp. 239-248, vol. 27, No. 2, Slovak Academy of Sciences and Slovak Chemical Society, Slovakia.
Matthews, George, "PVC: Production, Properties and Uses," The Institute of Materials, Book 587, 1996, 33 pages, The Institute of Materials, London, England, UK.
Nass, Leonard I., and Heiberger, Charles A., Editors, Encyclopedia of PVC Second Edition, Revised and Expanded, vol. 1: Resin Manufacture and Properties, 1986, 70 pages, Marcel Dekker, Inc., New York, NY, USA.

Nass, Leonard I., Editor, Encyclopedia of PVC Second Edition, Revised and Expanded, vol. 3: Compounding Processes, Product Design, and Specifications, 1992, 6 pages, Marcel Dekker, Inc., New York, NY, USA.
Salant, Katherine, "Laminates Move Beyond Kitchen," Orlando Sentinel, Dec. 5, 1999, 4 pages (retrieved from Internet Sep. 21, 2017).
Skillicorn, D.E., et al., "Molecular Weight and Solution Viscosity Characterization of PVC," Journal of Vinyl Technology, Jun. 1993, pp. 105-108, vol. 15, No. 2, Wiley-Blackwell, USA.
Defendant Halstead New England Corp.'s Answer to the Third Amended Complaint, Affirmative Defenses and Counterclaim—*Välinge Innovation AB* v. *Halstead New England Corp. and Home Depot U.S.A., Inc.*, United States District Court for the District of Delaware, C.A. No. 16-1082-LPS-CJB, dated Aug. 8, 2018, 172 pages (Document 242, 242-1, 242-2, 242-3—Redacted Version of Document 230).
Joint Motion for Entry of Partial Summary Judgment—*Välinge Innovation AB* v. *Halstead New England Corp. and Home Depot U.S.A., Inc.*, United States District Court for the District of Delaware, C.A. No. 16-1082-LPS-CJB, dated Sep. 13, 2018, 4 pages (Document 262).
Order of Partial Summary Judgment—*Välinge Innovation AB* v. *Halstead New England Corp. and Home Depot U.S.A., Inc.*, United States District Court for the District of Delaware, C.A. No. 16-1082-LPS-CJB, dated Sep. 13, 2018, 2 pages (Document 262-1).
Memorandum Opinion, *Välinge Innovation AB* v. *Halstead New England Corp. and Home Depot U.S.A., Inc.*, United States District Court for the District of Delaware, C.A. No. 16-1082-LPS-CJB, dated May 7, 2018, 19 pages (Document 162).
Order, *Välinge Innovation AB* v. *Halstead New England Corp. and Home Depot U.S.A., Inc.*, United States District Court for the District of Delaware, C.A. No. 16-1082-LPS-CJB, dated May 7, 2018, 2 pages (Document 163).
U.S. Appl. No. 16/197,992, Darko Pervan and Tony Pervan, filed Nov. 21, 2018.
U.S. Appl. No. 16/197,992.
Nullity Action (German language) mailed Jun. 7, 2018 in EP 2 248 665 (DE 600 47 813.0), Bundespatentgericht, Munich, DE, 8 pages.
*Anlage D2*—"Polycarbonate", Wikipedia definition (in German), retrieved Mar. 14, 2018, https://de.wikipedia.org/wiki/Polycarbonate, 1 page.
*Anlage D3*—"Acrylnitril-Butadien-Styrol-Copolymer", Wikipedia definition (in German), retrieved Mar. 14, 2018, https://de.wikipedia.org/wiki/Acrylnitril-Butadien-Styrol-Copolymer, 1 page.
*Anlage D4*—Chanda, Manas and Roy, Salil K., Ed., *Plastics Technology Handbook*, Third Edition, Revised and Expanded, 1998, 20 pages including cover, inside cover, p. 171, pp. 271-274, pp. 538-543, pp. 1026-1028, back page; T. Marcel Dekker, Inc., New York, NY.
*Anlage D6*—Certified Copy of U.S. Appl. No. 08/899,118, filed Jul. 23, 1997, 36 pages.
U.S. Appl. No. 16/197,992 entitled "Floor Panel with Sealing Means," filed Nov. 21, 2018.
Third Amended Complaint, *Välinge Innovation AB* v. *Halstead New England Corp. and Home Depot U.S.A., Inc.*, United States District Court for the District of Delaware, C.A. No. 16-1082-LPS-CJB, dated Jul. 10, 2018, 69 pages (Document 214).
Reply (German language) from 14F Licensing B.V. in Nullification Case against EP 2 248 665 (DE 60047 813) mailed Apr. 3, 2019, Bundespatentgericht, Munchen, DE, 25 pages.
*Anlage D6a*—Extract from the Register of European Patents for EP0893473, 1 page.
*Anlage D15*—Affidavit of Charles Edward Sitch, Jan. 11, 2019, with attached Exhibit A—JP 10-102743, 10 pages.
*Analge D15a*—Exhibit B to Affidavit of Charles Edward Sitch, Jan. 11, 2019—English-language translation of JP 10-102743, 31 pages.

\* cited by examiner

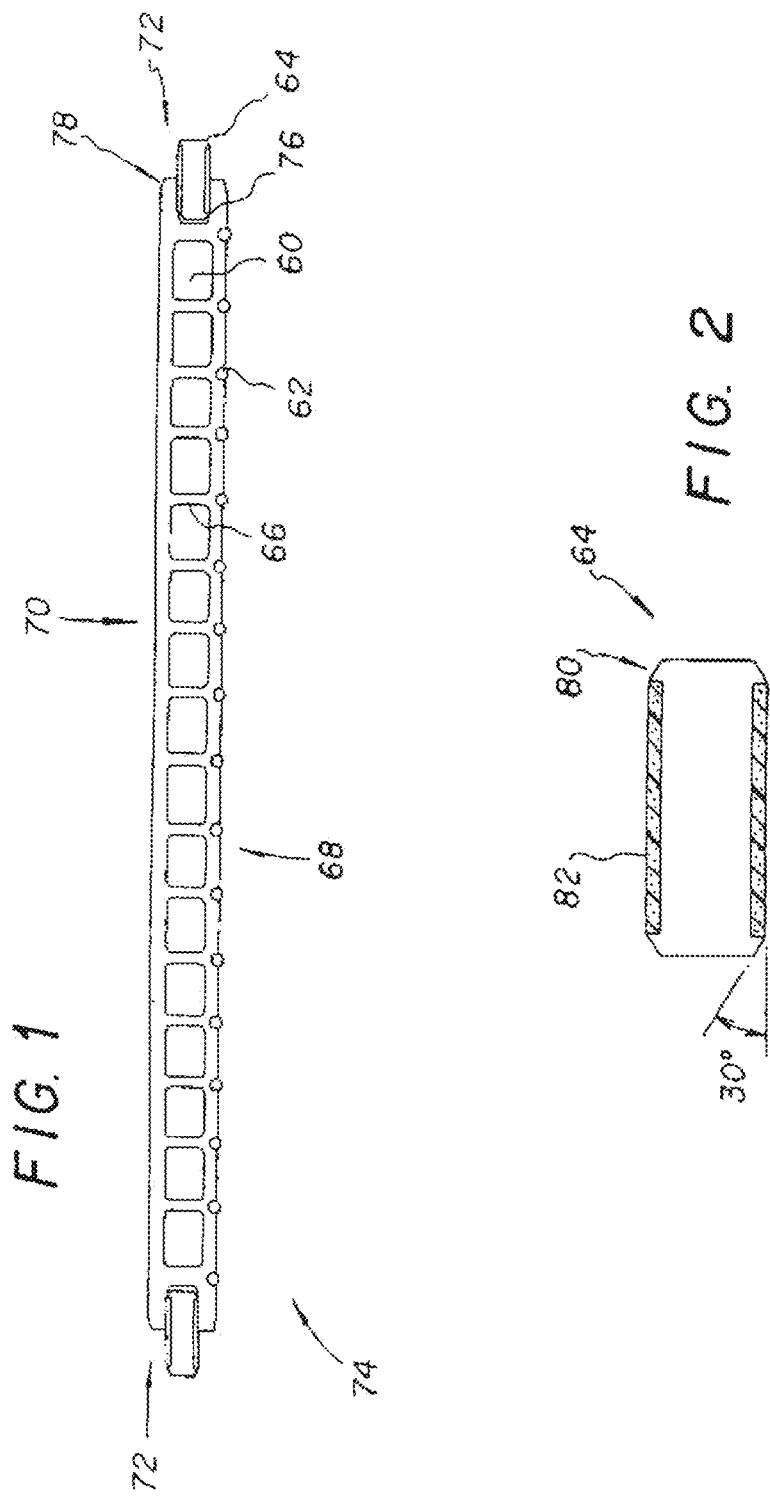

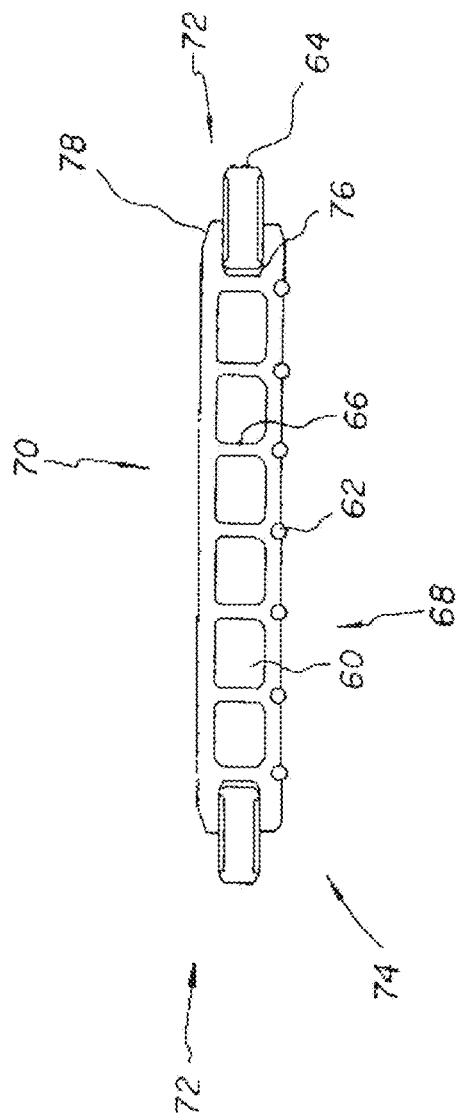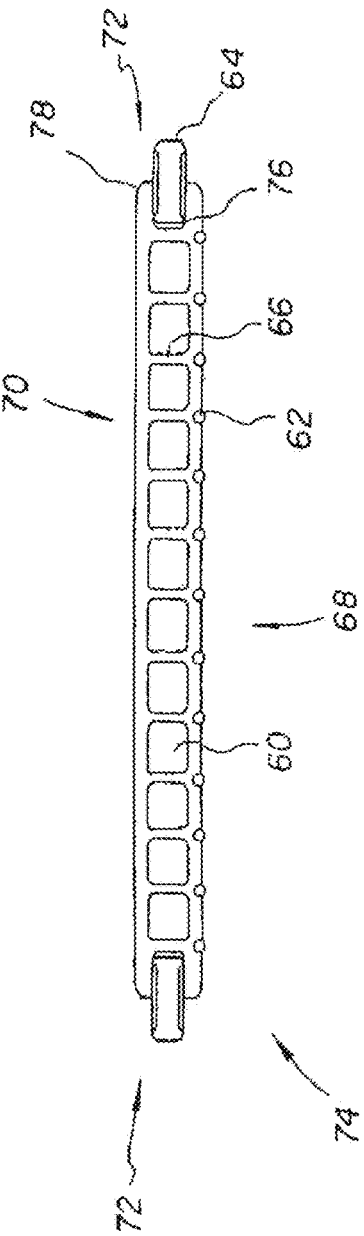
FIG. 5
FIG. 6

THERMOPLASTIC PLANKS AND METHODS FOR MAKING THE SAME

CROSS REFERENCE TO RELATED APPLICATIONS

This application is a continuation of U.S. application Ser. No. 14/462,951, filed on Aug. 19, 2014, which is a continuation of U.S. application Ser. No. 13/230,979, filed on Sep. 13, 2011, which is a continuation of U.S. application Ser. No. 12/825,447, filed on Jun. 29, 2010, now U.S. Pat. No. 8,021,741, which is a continuation of U.S. application Ser. No. 12/196,488, filed on Aug. 22, 2008, now U.S. Pat. No. 7,762,345, which is a continuation of U.S. application Ser. No. 11/788,421, filed on Apr. 20, 2007, now U.S. Pat. No. 7,419,717, which is a division of U.S. application Ser. No. 10/104,383, filed on Mar. 22, 2002, now U.S. Pat. No. 7,211,310, which is a division of U.S. patent application Ser. No. 09/460,928, filed Dec. 14, 1999, now U.S. Pat. No. 6,617,009. The entire contents of each of U.S. application Ser. No. 14/462,951, U.S. application Ser. No. 13/230,979, U.S. application Ser. No. 12/825,447, U.S. application Ser. No. 12/196,488, U.S. application Ser. No. 11/788,421, U.S. application Ser. No. 10/104,383, and U.S. patent application Ser. No. 09/460,928 are hereby incorporated herein by reference in their entirety.

BACKGROUND OF THE INVENTION

Commercially available laminate flooring (using high or medium density fiberboard or particle board as the core layer) has gained overwhelming success in the flooring market. The growth rate of the laminate flooring has remained in the double digits since the product was introduced in the United States market. The success of this product is credited to certain properties such as stain resistance, wear resistance, fire resistance, good cleanability, and the ability to use just about any type of printed design. In addition, the overall emission of organic compound vapor is low and the laminate flooring is considered color stable and environmentally friendly over other competing flooring products.

The biggest concern with commercially available laminate flooring is the moisture resistance of the finished product and the sensitivity of the raw materials (high or medium density fiberboard, paper, and particle board) to moisture during the manufacturing process. In some instances, the moisture can lead to some serious quality control issues and application restraints. For instance, and just to name a few, the higher moisture content in the product, such as in the particle board or fiberboard, can cause blistering and adhesion failure of the melamine surface to the core. Also, higher moisture contents can lead to dimensional instability of the finished product, which then results in the cupping or doming of the product, which is extremely undesirable, especially when installers are laying down the flooring. Also, excessive moisture contents can create edge peaking due to the swelling of the product and such edge peaking can result in edge chip-off or premature wear-out or can soil more quickly. The susceptibility to moisture content also leads to some installers not wishing to place such laminate flooring in areas which are subject to having water on the surface of the floor, such as in the kitchen and bathroom areas.

The suppliers of such laminate flooring have appreciated the problems associated with their products and have attempted to overcome these problems by developing laminate flooring having better moisture resistance by using melamine, phenolic, or isocyanate binders to partially replace urea resins present in the laminate flooring. While this improvement has made the product more moisture resistant, the current commercially available laminate floorings are still prone to moisture damage. For instance, the thickness swelling of laminate flooring can increase by 10% and water absorbency can exceed more than 15% according to the 24 hours water absorption test. Another attempted solution at the moisture resistance weaknesses of current laminate flooring has led some manufactures to apply a water-repellant material on the upper edges of the tongue and groove areas which further serve to resist any moisture penetration through joints. Still another attempted solution involves applying silicone caulk to seal the edges and voids of the laminate perimeter where the laminate flooring meets the wall. However, if very stringent installation instructions are not followed, the laminate flooring will still be subjected to moisture damage.

Accordingly, there is a need to develop a laminate flooring system which overcomes the above weaknesses and disadvantages of current commercially available laminate flooring.

SUMMARY OF THE INVENTION

A feature of the present invention is to provide a laminate plank which can be used in a surface covering system which provides improved moisture resistance and is not susceptible to damage caused by moisture.

Another feature of the present invention is to provide a laminate plank and surface covering system which is economically feasible and permits easy installation and flexibility.

A further feature of the present invention is to provide a flooring system that improves foot comfort and other ergonomic benefits.

An additional feature of the present invention is to provide a surface covering system having improved sound deadening and other reduced sound transmission benefits.

Still another feature of the present invention is to provide a surface covering system which has significant improvements with respect to ease of installation and includes a fool-proof installation design and technique.

Another feature of the present invention is to provide a surface covering system which avoids the use of a wet adhesive application method.

Another feature of the present invention is to provide a flooring system that has great flexibility so as to make various shapes, sizes, and bevel edges.

Another feature of the present invention is to provide a flooring system that can alleviate the requirement of installing the plank in a given orientation.

Also, a feature of the present invention is provide a surface covering system which has the ability to tolerate some imperfections in the sub-floor or substrate and thus avoid telegraphing the imperfections on the surface covering itself.

A further feature of the present invention is to provide a surface covering system which has improved damaged resistance properties, such as improved impact strength and the like.

Additional features and advantages of the present invention will be set forth in the description which follows, and in part will be apparent from the description, or may be learned by practice of the present invention. The features and other advantages of the present invention will be realized and attained by means of the elements and combinations particularly pointed out in the written description and appended claims.

To achieve these and other advantages and in accordance with the purpose of the present invention, as embodied and broadly described herein, the present invention relates to a thermoplastic laminate plank, wherein the laminate plank has a core comprising at least one thermoplastic material, wherein the core has a top surface and a bottom surface. Optionally affixed to the top surface of the core can be a print layer, wherein the print layer has a top surface and a bottom surface. Also, an overlay layer is affixed to the top surface of the print layer. The plank can optionally contain an underlay layer located and affixed between the bottom surface of the print layer and the top surface of the core.

The present invention further relates to a method of making a thermoplastic laminate plank and involves the step of extruding at least one thermoplastic material into the shape of a core and optionally affixing a laminate on the core, wherein the laminate comprises an overlay layer affixed to the top surface of a print layer and optionally an underlay layer affixed to the bottom surface of the print layer.

Also, the present invention relates to a method of making a thermoplastic plank by printing a design directly on the top surface of the plank using any number of printing techniques, such as gravure printing, transfer printing, digital printing, Flexo printing, and the like. The method includes applying a protective coating on top of the printed design, such as a polyurethane type coating with or without wear resistant particles in the coating.

A further embodiment of the present invention relates to making a thermoplastic plank for flooring by co-extrusion techniques, which involves extruding at least one thermoplastic material into the shape of the core and also extruding a layer containing at least one thermoplastic material with one or more pigmented compounds on top of the extruded core, wherein the layer simulates a design, such as wood grain.

The present invention also relates to thermoplastic planks having the above-described characteristics.

It is to be understood that both the forgoing general description and the following detailed description are exemplary and explanatory only and are intended to provide further explanation of the present invention, as claimed.

The accompanying drawings, which are incorporating in and constitute a part of this application, illustrate several embodiments of the present invention and together with the description serve to explain the principles of the present invention.

BRIEF DESCRIPTION OF THE DRAWINGS

FIG. 1 is a schematic diagram showing a side view of one embodiment of the thermoplastic laminate plank of the present invention.

FIG. 2 is a schematic diagram showing a side view of a spline design which can be used in the present invention.

FIGS. 5 and 6 are schematic diagrams showing sectional views of additional embodiments of the thermoplastic laminate plank of the present invention.

DETAILED DESCRIPTION OF THE PRESENT INVENTION

Figure 3:
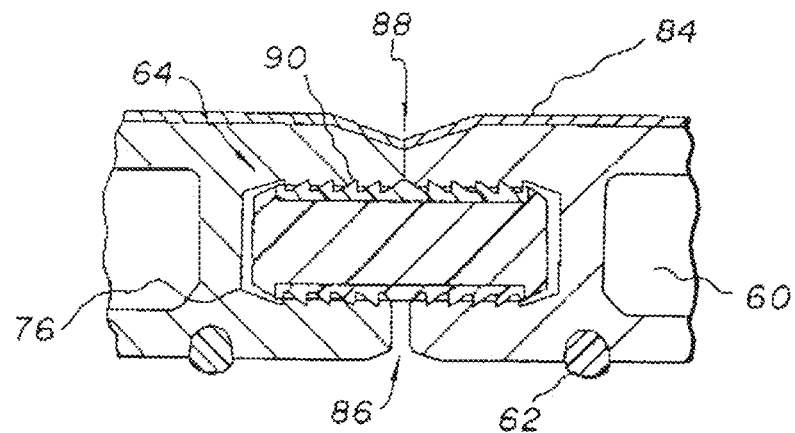
FIG. 3 is a schematic diagram of a sectional view showing another embodiment of a thermoplastic laminate plank of the present invention.

In general, the present invention relates to a thermoplastic laminate plank which contains a core comprising at least one thermoplastic material. This core has a top surface, a bottom surface, and at least four sides or edges. Located or affixed on the top surface of the core is a print layer where the print layer has a top surface and a bottom surface. Optionally located or affixed onto the top surface of the print layer is an overlay layer having a top surface and a bottom surface. The thermoplastic laminate plank of the present invention can optionally and further contain an underlay layer which is located and affixed between the bottom surface of the print layer and the top surface of the core.

In more detail, the core in the thermoplastic laminate plank is made of at least one thermoplastic material. Generally, any thermoplastic material, combinations thereof, alloys thereof, or mixtures of two or more thermoplastics can be used to form the core. Generally, such thermoplastic materials include, but are not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof; polypropylene and copolymers thereof; saturated and unsaturated polyesters; acrylics; polyamides such as nylon containing types; engineering plastics such as acetyl, polycarbonate, polyimide, polysufone, and polyphenylene oxide and sulfide resins and the like. One or more conductive polymers can be used to form the plank, which has applications in conductive flooring and the like. The thermoplastic polymers set forth in Kirk Othmer ($3^{rd}$ Edition, 1981) at pp. 328 to 848 of Vol. 18 and pp. 385-498 of Vol. 16, (incorporated in their entirety by reference herein) can also be used as long as the resulting plank has sufficient strength for its intended purpose.

Preferably, the thermoplastic material is a rigid polyvinyl chloride but semi-rigid or flexible polyvinyl chloride may also be used. The flexibility of the thermoplastic material can be imparted by using at least one liquid or solid plasticizer which is preferably present in an amount of less than about 20 phr, and more preferably, less than 1 phr. A typical rigid PVC compound used in the present invention to form the core can also include, but is not limited to, pigments, impact modifiers, stabilizers, processing aids, lubricants, fillers, wood flours, other conventional additives, and the like.

The thermoplastic polymer compound to be processed can be in powder, liquid, cubed, pelletized form and/or any other extrudable form. Also, the thermoplastic polymer can be virgin, recycled, or a mixture of both. Furthermore, the thermoplastic material can be incorporated with a blowing agent(s) or a mechanically injected gas during the extrusion process to make a cellular foam structure core.

The thermoplastic material used to form the core, which is preferably polyvinyl chloride, is preferably a suspension grade or mass polymerization grade homopolymer resin having a preferred molecular weight as reflected by an inherent viscosity of from about 0.88 to about 1.0 inherent viscosity. In general, a higher molecular weight polymer is preferred from the standpoint of processing stability and preferably the molecular weight distribution and particle size distribution are narrow in order to provide a good balance between processability and properties. Also, high porosity and uniform porosity of the resin particles are preferred to optimize compounding and processing aspects, including the fast and uniform absorption of any stabilizer that is present as well as other ingredients during compounding.

Preferably, the thermoplastic material used to form the core is a rigid PVC powder compound that has good impact strength, ease of processing, high extrusion rate, good surface properties, excellent dimensional stability, and indentation resistance.

The preferred thermoplastic polymer used to form the plank is a polyvinyl chloride from The Geon Company designated X150-206-050-02, which has the following formula:

| FORMULATION | PARTS BY WEIGHT |
| --- | --- |
| Extrusion Grade PVC (0.88-0.96 IV) | 100 |
| Tin Mercaptide Stabilizer | 2-4 |
| PVC Acrylic Processing Aid | 1-3 |
| Filler | 10-30 |
| Impact Modifier (Acrylic) | 3-10 |
| Lubricant Package | 2-5 |
| Pigment | 1-5 |

The polyvinyl chloride preferably has the following properties:

| GEON COMPOUND | ASTM METHOD | 87150 |
| --- | --- | --- |
| Type | | Cube |
| Cell Classification | D1784 | 13344-C |
| Specific Gravity 0.2 | D792 | 1.45 |
| Hardness-Durometer Shore D 3 | D2240 | 82 |
| Tensile Properties - Strength PSI | D638 | 6000 |
| Tensile Properties - Modulus PSI | D638 | 390000 |
| Flexural Properties - Strength PSI | D790 | 11000 |
| Flexural Properties - Modulus PSI | D790 | 370000 |
| Heat Deflection Temperature F. Unannealed @ 1.82 MPa (264 PSI) | D648 | 160 |
| Coefficient of Linear Expansion in./in. F. | D696 | $3.4 \times 10^{-5}$ |
| Notched IZOD Ft.lb./in. of notch @ 23 C. (73 F.) | D256 | 3 |
| Impact Properties - Drop Impact in.lb/mil @ 375 F melt T. | D4226 | |
| ¼" Dart H.250 Method A | | 1.0 |
| ¼" Dart H.250 Method B | | 1.0 |
| ⅛" Dart H.125 Method A | | 1.0 |
| ⅛" Dart H.1250 Method B | | 1.0 |

Generally, this compound will have a melt temperature of from about 360 to about 390° F. Preferably, a stabilizer is also present in the thermoplastic formulation that forms the core. A preferred stabilizer is a butyl tin mercaptide stabilizer. In addition, an impact modifier is also preferably present and preferred impact modifiers are acrylic-based from Rohm and Haas, an EVA-based impact modifier known as Elvaloy™ from DuPont; and others such as chlorinated polyethene and acrylonitrile butadiene styrene, and the like.

In addition, the thermoplastic formulation preferably contains at least one processing aid which is preferably an acrylic based low molecular weight resin such as Acryloid K-125 or K-175 from Rohm and Haas. Also, at least one lubricant is preferably present and more preferably an internal lubricant and an external lubricant. Preferred internal lubricants, which act internally to alter the cohesive forces amongst the polymer chains that results in lower melt viscosity without reducing the strength properties of the resin, are metallic stearates such as calcium and zinc salts of stearic acid. External lubricants, which act externally to prevent resins from sticking to hot metal processing machinery by reducing friction between the services, are preferably low-melting paraffins. Fillers are preferably added to the thermoplastic formulation to reduce product cost and to improve impact properties. While any filler can be used as long as it is compatible with the thermoplastic resin, typical fillers include, but are not limited to, calcium carbonate.

Preferably, the thermoplastic core is rigid in nature and has the following range of preferred properties: impact resistance, static load resistance, indentation resistance, moisture insensitivity, pre-profiled configuration, and the like.

While the core can be made in a number of ways, preferably the core is formed by an extrusion process wherein the thermoplastic material along with any other optional ingredients are blended together and are then fed into an extruder by a feeder wherein the extruder with the application of heat and auger action melts the thermoplastic material to the extent that it is eventually fed through a die, wherein the die is in the shape of the core.

In more detail, the extrusion process permits a) an economically feasible design by designing a profile with cavities inside the structure and b) a highly versatile method of achieving the complicated profile design of the preferred plank without additional machining afterwards for the tongue and groove, for instance. While any extruder can be used which can extrude the desired design of the plank for thermoplastic materials, preferably the extruder is one from American Maplan corporation such as model TS-88 which has the ability to process rigid PVC profiles with an maximum output capacity of about 900 lb/hr, based upon a compound bulk density of 37 lb/ft$^3$. The TS-88 is a twin screw extruder which has a barrel heating section and a cooling section as well as a vacuum system. In the extruder, there can be 12 temperature zones with 6 for cooling and a temperature control system.

The dimensions of the core can practically be any shape or size as long as such material can be extruded as one piece or multiple pieces. For instance, the core preferably has a thickness of from about 3 mm to about 50 mm, a width of from about 2 cm to about 60 cm, and a length of from about 30 cm to about 215 cm. Also, the top surface of the core can optionally have a textured surface on the top surface as part of the core which is extruded through the die. A mechanical embossing row can be located behind the cooling calibrator and after the extrusion die to achieve surface texturing of the extruded core. Any variety of textures can be created by this method on the core such as wood grains and the like.

Also, as an option, the core can be 100% solid or can have one or more cavities or cells which are located between the upper and lower surfaces of the core. While the cavities are optional, the cavities are preferred since they reduce the amount of thermoplastic material used and create a lighter weight product. The cavities or cells which can be part of the extruded core preferably have cavities having dimensions of from about 3 mm to about 16 mm in height, by about 6 mm by about 20 mm in width, and can be separated by solid thermoplastic material having a thickness of from about 1.0 mm to about 3.02 mm. The optimal dimension of cavities is dependent upon the requirement of the product withstanding the potential impact force of falling objects. The cavities which are preferably present can be any shape such as rounded, oval, or rectangular. These cavities or cells preferably exist across the entire distance of the core as shown in FIGS. 1, 5, and 6. Another advantage is that wires, cables, fiber optics, and/or piping can be run through the cavities which makes installation of wiring and piping quite easy without the necessity of putting holes through walls, or running wires underneath the floor or in the ceiling. Further, if necessary, holes can be drilled through the thermoplastic material separating one cavity from another in order to have the wire or piping go in a perpendicular direction when necessary. Alternatively, for certain thermoplastic core pieces, the cavities can be run in a perpendicular direction from the remaining pieces in order to accommodate the direction that wiring or piping may take when being placed in a room.

The cores which form the plank are preferably all made from the same die design and thus they are uniform in appearance. Also, the cavities which are preferably present in the core align with the cavities in respective core pieces. Dowels or other equivalent material can be inserted into the cavities at the short end of the plank in order to join an adjacent plank to create a tight seal at each seam. This type of coupling system, though optional, will further insure a very secure tight fitting floating floor or other surface covering.

Though not necessary, the ends of the plank as well as the tongue and/or groove can have a bonding agent applied to these locations in order to seal or bond the planks together. Surprisingly, the inventors have discovered that sealant compositions such as tetrahydrofuran have the ability to actually work as a bonding agent to join the planks together. In one of the examples that follows, the results show that by using tetrahydrofuran or compositions like tetrahydrofuran, the joints of the planks which have been attached with the use of this composition leads to the formation of a bond between the planks and increases the overall bond strength of two adjoining boards significantly. The use of this bonding agent can be used not only with the planks described above but with all thermoplastic planks. One advantage of using a bonding agent like tetrahydrofuran is that it is environmentally safe, it is simple to use and leaves no residue on the surface after evaporation. Thus, no adhesive marks are left on the surface of the planks. In addition, applying such bonding agents like tetrahydrofuran is quite easy since it can be applied by brush or spray or applicator tip using gravity or other force such as squeezing an applicator bottle, and any excess is easily removed unlike the application of some adhesives for tiles and the like. Other examples of other suitable bonding agents which have this ability to bond the thermoplastic planks include, but are not limited to, methylene chloride and ketones and the like. Examples of ketones include, but are not limited to methyl ethyl ketone, methyl amyl ketone, dipropyl ketone, methyl isobutyl ketone, n-methyl pyrrolidone, dimethyl formamide, cyclohexanone, nitrobenzene, and the like.

Another optional aspect of the core is the presence of a groove and/or a tongue design on preferably two sides or edges of the core wherein the sides or edges are opposite to each other. While the core design can have a tongue design on one edge and a groove design on the opposite edge, it is preferred that both edges which are opposite to each other have a groove design. This tongue and/or groove design on the core can be formed as part of the extruded core. The tongue or groove can have a variety of dimensions but preferably the groove which is present on two, opposite edges has internal depth dimension of from about 5 mm to about 12 mm and a height of from about 3 mm to about 5 mm. The bottom width of the side having the groove is slightly shorter than the upper width of the same side to ensure no gap exists between planks after butting together. In addition, it is preferred that the groove have teeth located on the upper surface and lower surface of the groove to receive an interlocking tongue, wherein the tongue is a separate component which will be described later. The teeth which can preferably be present as part of the extruded groove forming part of the extruded core are preferably from about 0.7 mm to about 1.2 mm in size for each tooth and having an angle of from about 30 to 45 degrees with a backward bite enabling more easy insertion than removal of the tongue portion. A preferred design is set forth in FIGS. 3 and 4.

Also, as an option, any edge, and preferably the edges which preferably have the tongue and/or groove are preferably tapered or beveled so that when two cores are brought together for attachment, a valley or V-shaped valley is formed. Preferably, the tapered or beveled edges are at an angle of from about 15° to about 55°, and more preferably at about a 17° angle. Also, the length of the beveled or tapered edge is about 2.0 mm to about 7.0 mm on each core piece. A preferred design is set forth in FIG. 3.

As another option, the core can have located on its bottom surface any number of bottom feet which are preferably pieces of rubber or thermoplastic material which are attached to the bottom surface of the core. Preferably, the bottom feet are thermoplastic material and more preferably are soft thermoplastic material which are post-extruded onto the bottom surface of the plank. While the bottom feet can have any dimensions, preferably the bottom feet have an outer dimension of from about 1.0 mm to about 5.0 mm. The bottom feet provide numerous functions such as increasing the soft, cushion feeling of the plank to improve foot comfort level and also reduces the problems associated with sub-floor or substrate imperfections. The bottom feet can also assist in controlling sound transmissions, and thus have sound deadening properties. Also, the bottom feet insure that migration from any mold, mildew, and/or stain which may be part of the sub-floor or substrate can be minimized if not eliminated by the bottom feet.

As an additional option, the product with bottom feet can be installed upside down to make a slip resistance floor for such applications as escalators or stairways.

The bottom feet are located on the bottom surface of the core and can be installed using serrations or a series of linear grooves which can be formed as part of the extruded core and then these serrations can then be subsequently post extruded with a line of post extruded soft polymeric material which fills in the serration and extends beyond the bottom surface of the core to support the core above a sub-floor or substrate. Typically, the post extruded material extends beyond the bottom surface from the core by about 10 mils to about 75 mils, and more preferably from about 25 mils to about 50 mils. FIGS. 1, 3, 5, and 6 further show embodiments of how the post extruded lines of thermoplastic material can serve as a support mechanism.

With respect to the laminate on top of the core, a print layer is affixed to the top surface of the core, wherein the print layer has a top surface and a bottom surface. The print layer preferably is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. Preferably the aminoplast resin is a blend of an urea formaldehyde and a melamine formaldehyde.

The print paper, also known as the Deco paper, preferably should have the ability to have liquids penetrate the paper such as a melamine liquid penetrating in about 3 to 4 seconds and also maintain a wet strength and even fiber orientation to provide good reinforcement in all directions. Preferably, the resin used for the impregnation is a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) provides a positive interaction in controlling shrinkage and reducing cloudiness. Preferably, the type of paper used is 75 $g/m^2$ weight and having a thickness of 0.16 mm. The saturation of the coating preferably is about 64 $g/m^2$.

Located optionally on the top surface of the print layer is an overlay. The overlay which can also be known as the wear layer is an overlay paper, which upon being affixed onto the print layer, is clear in appearance. The overlay paper is preferably a high abrasive overlay which preferably has aluminum oxide embedded in the surface of the paper. In addition, the paper is impregnated with an aminoplast resin just as with the print layer. Various commercial grades of high abrasive overlays are preferably used such as those from Mead Specialty Paper with the product numbers TMO 361, 461 (70 gram/$m^2$ premium overlay from Mead), and 561 wherein these products have a range of Taber values of 4000 to 15000. The type of paper preferably used is about 46 $g/m^2$ and having a thickness of about 0.13 mm.

With respect to the print layer and the overlay, the amount of aminoplast resin is preferably from about 60 to about 140 $g/m^2$ and more preferably from about 100 to about 120 $g/m^2$.

As an option, an underlay can be located and affixed between the bottom surface of the print layer and the top surface of the core. Preferably the underlay is present and is paper impregnated with an aminoplast resin as described above with respect to the print layer and overlay. Preferably, the underlay is Kraft paper impregnated with aminoplast resins or phenolics and more preferably phenolic formaldehyde resin or melamine formaldehyde resin which is present in an amount of from about 60 $g/m^2$ to about 145 $g/m^2$ and more preferably from about 100 $g/m^2$ to about 120 $g/m^2$ paper. The type of paper used is preferably about 145 $g/m^2$ and having a thickness of about 0.25 mm. The underlay is especially preferred when extra impact strength resistance is required.

Preferably, the thermoplastic laminate plank can be prepared by extruding the core as described above and forming a laminate comprising the overlay affixed to the top surface of the print layer and optionally the underlay layer with which is affixed to the bottom surface of the print layer. This laminate can be prepared by, for instance, any process customarily used to manufacture laminate films such as a continuous double belt press. In general, the underlay, if used, the print layer and the overlay can be fed into a continuous double belt press that serves as a laminating calendar. Preferably, the continuous operation is an isobaric system wherein pressures can go as high as 30 bar and the line speed can be up to 20 meters per minute. The pressure zone length is about 2-3 meters. In this continuous double belt press system, the isobaric system provides a steady uniform pressure effect on each point of the treated surface of the laminate. Embossing of the laminate can be accomplished by embossed release paper or the belt of the double belt press can be embossed to produce surface textures. In a continuous double belt press, the simultaneous heating of the laminate with proper dwell time and pressure forms the laminate film which then can be rolled up for subsequent application. Once the laminate is formed it can be applied onto the core and is preferably affixed by any means, such as with an adhesive. Preferably the adhesive is a hot melt adhesive such as a hot melt glue like hot melt polyurethane glue.

The hot melt adhesive, such as the hot melt polyurethane adhesive, is preferably applied to the back surface of the laminate film at a preferred temperature of from about 250° F. to about 300° F., more preferably from about 250° F. to about 275° F. These temperatures may vary slightly depending upon the adhesive. The application of the hot melt adhesive to the laminate can be done by a direct roll coater. The laminate with the adhesive on the back surface can then be heated to an adequate temperature to soften the laminate and allow the laminate to form to the profile of the thermoplastic core and thus be affixed permanently. The typical wrapping machine is designed to hold the laminate to the contour of the thermoplastic plank as it is being cooled below about 90 to about 100° F. The thickness of the application of the adhesive can have an effect on the impact resistance of the finish product. If the application of the adhesive is too thick, an impact may cause the laminate to become brittle and crack. A thin application enables the laminate to flex less during impact and minimize the damage. Application of the adhesive is preferably from about 5 to about 15 $g/ft^2$ and more preferably from about 6 about 12 $g/ft^2$. A preferred hot melt adhesive is Ever-Lock® 2U145/2U230 modified polyurethane adhesive reactive hot melt from Reinhold Chemicals, Inc.

As described early, the various laminate planks of the present invention can be connected together by a tongue piece or spline or snap connector. A separate spline or snap connector is a separate piece and is especially effective when a groove is present on two, opposite sides or edges of the thermoplastic laminate plank. The snap or tongue piece can be inserted into one groove and is long enough to extend outside the groove and fit into a respective groove of another thermoplastic laminate plank in order to connect the two pieces together. Preferably, the tongue piece or snap connector is a co-extruded material that is made of a rigid thermoplastic material such as polyvinyl chloride or polyvinyl chloride/rubber blends in the central portion and a soft thermoplastic material such as soft polyvinyl chloride wherein the soft thermoplastic material is at the top and bottom surface of the snap connector in order to be flexible when inserted into the groove so as to fit securely to the teeth portions of the groove in the preferred embodiment.

In the present invention, while each of the thermoplastic laminate planks can be affixed to the sub-floor or substrate, it is preferred that the thermoplastic laminate planks be attached only to each other through the groove system such that there is a floating floor system. This promotes fast and easy laying of the floor system.

With the thermoplastic laminate planks of the present invention, the present invention achieves many benefits and advantages such as moisture resistance and mechanical properties such as impact strength, resistance to indentation and gouges, and beneficial acoustical properties. Further, the laminate plank system of the present invention can be used in any environment, dry or wet, indoor or outdoor since it is not susceptible to moisture. In an embodiment of the present invention, the planks are less sensitive to the combined effects of temperature and humidity than is the standard laminate product. As a result, the need for T-moldings to act as expansion and contraction areas of the floor can generally be eliminated. These T-moldings are not only unsightly, but can act as tripping hazards. By the elimination of T-moldings/expansion joints in the walkway, the present invention allows the use of the floor in commercial applications. In an embodiment, the present invention expanded only one fifth as much as a standard laminate product under identical conditions. These conditions take the product from ambient room conditions to conditions of 100% relative humidity and 90° F. Standard expansion joints for laminate are typically placed every 30 feet. Thus, a hallway of 150 feet would be feasible without an expansion joint with the present invention.

A second study shows that by post conditioning the planks, such as at 240° F. for varying times of from 20 to 40 seconds, the planks may be rendered even more stable. This treatment is referred to as thermal balancing. Results are described in the table below.

| Description of Flooring | Growth in Width** | Growth in Length** |
|---|---|---|
| Plank #1* | 0.03% | 0.03% |
| Plank #2* | 0.03 | 0.03 |
| Plank #3* | 0.04 | 0.03 |
| Laminate Plank (Comparison) (Commercial product) | 0.10 | 0.20 |

*present invention
**Conditions start at ambient room conditions. Product expands during change to 90° F. and 100% RH.

Also, in the preferred embodiment of the present invention, the installation method used as a result of the unique designs of the thermoplastic laminate planks of the present invention preferably eliminates the glue used for tongue and groove connections.

In the preferred embodiment of the present invention, the installation method utilizes the unique design of the product to eliminate the need for glue used in tongue and groove connections.

Furthermore, the installer has options for installing the thermoplastic laminate plank product. In one method, a floating floor installation method can be utilized. In this method, no adhesive is applied to bond the product to the subfloor surface. The benefits of this method have been described earlier.

In a second method, a full-spread adhesive is applied between the underside of the product and the sub-floor surface. This provides the advantages of added dimensional stabilization and sound deadening. Both of these properties would be beneficial in commercial applications.

In addition, the excellent moisture resistance and sound deadening qualities of this product can eliminate the need for underpadding, though use of underpadding is an option.

A further embodiment of the present invention relates to a thermoplastic plank which comprises the same plank described above but, in lieu of a laminate on top of the plank, a design is printed directly on the top surface of the plank using any number of printing techniques such as gravure printing, transfer printing, digital printing, flexo printing, and the like. Or, a printed thermoplastic film (e.g., PVC) or a wood veneer and the like can be laminated to a thermoplastic plank. A protective coating can then be placed on top of the printed design. Any type of protective coating or wear layer can be used such as a polyurethane type coating with or without wear resistant particles in the coating. Thus, a thermoplastic plank would comprise a core comprising at least one thermoplastic material where the core has a top surface and bottom surface as well as opposing sides and a printed design directly on the top surface of the plank and optionally at least one protective coating on top of the printed design. The top surface of the plank as described earlier, can have a textured surface as described above.

This type of thermoplastic plank can be made by extruding at least one thermoplastic material into the shape of the core and then printing a design directly on the top surface of the plank and then optionally applying at least one protective coating on top of the printed design and curing the protective coating. The protective coating can be applied by conventional techniques, such as curtain coater, direct roll coater, differential roll coater or air knife coater or spray apparatus.

In another embodiment of the present invention, a thermoplastic plank for surface coverings, such as flooring, has a thermoplastic core as described above in the other embodiments and a extruded layer on the top surface of the core wherein this extruded layer comprises at least one thermoplastic material with one or more pigmented compounds. This extruded layer on top of the extruded core can simulate various designs such as wood grain and the like.

The thermoplastic plank in this embodiment can be made by co-extrusion techniques which involves extruding at least one thermoplastic material into the shape of a core and extruding either simultaneously or subsequently a layer containing at least one thermoplastic material with one or more pigmented compounds on top of the extruded core.

Another embodiment involves a thermoplastic plank having the same design as described above with a printed polymeric film, such as a PVC film placed on the top surface of the extruded core. The printed polymeric film can be a polymeric film having a printed design on the film wherein the film would preferably be from about 10 to about 20 mil thick. One or more wear layers or protective coatings can be placed on top of the printed polymeric film. The polymeric film can be placed on top of the extruded core by typical lamination techniques such as heating the printed film, then pressing the film to the extruded core to bond them together, or using glue to bond them together.

In more detail and with reference to the Figures, the Figures show various aspects of several embodiments of the present invention. With reference to FIG. 1, FIG. 1 represents a schematic diagram of a side view of one embodiment of the thermoplastic plank. The particular Figure is with the prospective view of looking at the front edge of the thermoplastic plank wherein the groove (76) would run along each edge of the plank. The spline or tongue (64) is inserted along the length of each groove (76). (72) points to the edges of the spline having the groove whereas (68) points to the lower or bottom surface of the spline and (70) points to the top surface or the surface that typically but optionally receives the print layer and the like. (62) refers to the feet or strips of post-extruded material which extends along the bottom surface of the core from the front edge to the back edge. As can be seen in FIG. 1, typically these post extruded lines of thermoplastic material act as a support mechanism and typically run parallel in the same parallel direction as the cavities (60). Preferably, and as shown in the embodiments in FIG. 1, the side of the plank which has a groove is typically tapered or beveled (78).

Referring to FIG. 2, FIG. 2 is a representation of one type of spline or tongue (64) that can be used in one embodiment of the present invention. As can be seen in FIG. 2, the preferably soft material (82) such as PVC is located on the top and bottom surface of the spline or tongue in order to ensure a tighter fit with the groove of the thermoplastic plank. The spline design preferably has a thickness of from about 3 mils to 5 mils thicker than the groove of the plank. If the spline is too thick, it can open the groove and cause edge peaking. If the spline is too thin, it does not effectively engage the groups with the teeth in the groove. The edges of the spline or tongue (64) are tapered or beveled (80) in order to ensure that the tongue can be inserted into the groove.

FIG. 3 makes reference to a spline (64) which has teeth (90) on the surfaces which engage the groove (76) of the thermoplastic plank. Further, as can be seen in FIG. 3, in a preferred embodiment, the top surfaces of the plank form a V shape valley (88) and the edge of the plank touches each other whereas the bottom portions of each respective plank are cut in order to have a slightly shorter length in order to form a gap (86) which ensures that the top ends (88) touch each other and do not leave any gaps on the walking surface of the planks. (84) shows a top layer(s), such as a print layer and the like.

Figure 4:
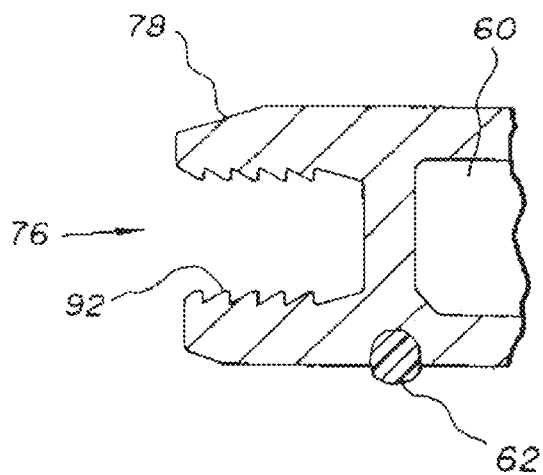
FIG. 4 is a schematic diagram showing a groove design for a plank of the present invention.

Referring to FIG. 4, FIG. 4 is a depiction of a tongue (76) which has receiving teeth (92) for a spline or tongue of the design shown in FIG. 3 (90). FIG. 4 further shows the post extruded lines on the bottom surface of the extrusion plank (62) as well as the various angles and cuts of the cavity (60) as well as the receiving groove (76). Further, the beveled or tapered edge (78) is further shown in FIG. 4.

FIGS. 5 and 6 represent various different widths of the plank but generally the same features as shown in FIG. 1 and the numbers in FIGS. 5 and 6 represent the same features.

The thermoplastic planks of the present invention can be used in a variety of applications including, but not limited to, wall panels, ceiling panels, flooring surfaces, decks, patios, furniture surfaces, shelving, and other surface coverings or parts thereof.

The present invention will be further clarified by the following examples, which are intended to be purely exemplary of the present invention.

EXAMPLES

Example 1

Compound:

In one case a PVC compound containing impact modifier, filler, stabilizer and processing aids in the amounts below was extruded through a profile die giving a hollow cross section as shown in FIGS. 1, 5, and/or 6.

| Ingredient | Amount (phr) |
|---|---|
| PVC Homopolymer | 100 |
| Thermal Stabilizer | 0.8-1.5 |
| Processing Aid | 0.5-1.0 |
| Impact Modifier | 3.0-4.0 |
| Lubricant internal | 0.6-1.0 |
| external | 1.1-1.5 |
| Filler | 20-35 |
| TiO$_2$ | 1.5-3.0 |

Extrusion Conditions: (See Figure for Diagram of Locations)

| | Barrel 1 | Barrel 2 | Barrel 3 | Barrel 4 | Barrel 5 |
|---|---|---|---|---|---|
| Barrel Temperatures, deg F. | 345-360 | 345-360 | 320-340 | 315-330 | 90-110 |
| Oil Temperature (through screw) | 285-300 | | | | |

| | Die 1 | Die 2 | Die 3 | Die 4 | Die 5 |
|---|---|---|---|---|---|
| Die Temperatures, deg F. | 345-360 | 360-370 | 360-370 | 380-390 | 370-380 |

| | |
|---|---|
| Percent Load | 63-75% |
| Main RPM | 950-1100 |
| Output | 356-550 pounds/hr (163-250 kg/hr) |
| Back Pressure | 18.1-19.0 metric tons |
| Melt Pressure | 4,075-4500 psi |
| Melt Temperature, deg. F. | 385-390 |
| Color Feeder | 0.35-0.70 pounds/hr setting of 5 for 0.35, setting of 10 for 0.70 |
| Line Speed | 8.5-8.75 feet/min |

Calibration Unit:

| | |
|---|---|
| Vacuum 1 | 16-20 in Hg |
| Vacuum 2 | 17-20 in Hg |
| Vacuum 3 | 12.5-15.0 in Hg |
| Vacuum 4 | off |
| Puller Force | 3560-4000 pounds |
| Water Temperature, deg F. | 61 |
| Pressure at Cooling and Sizing, psi | |
| #1 | 40 mbar |
| #2 | 40 mbar |
| Clamping Pressure at conveyor | |
| Front | 40-45 psi |
| Back | 28-35 psi |
| Counterbalance | 33-40 pis |

Specific Applications Wrapping Conditions:
Layout of Line/Conditions:

A machine was used to form the HPL (High Pressure Laminate top layer) onto the PVC Plank Base. The machine was called a "wrapping machine" and is composed primarily of two main parts 1) a forming action to shape the HPL to the contour of the base, and 2) a clamping action to retain the HPL shape onto the base as the adhesive cools and strengthens.

In more detail:

1. PVC Planks were placed onto the line to be conveyed through by rubber covered roller wheels. Speed of conveyance was 35-50 feet per minute in this particular application. In other application, speeds may range as high as 120 fpm.
2. PVC Planks underwent surface treatment to raise surface tension and improve the wetting of adhesive onto the surface. The surface treatment unit which was from Corotec, 145 Hyde Rd, Farmington, Conn.), provided plasma jet treatment. The surface tension was raised from 34 to 45+ dyne-cm.
3. HPL (laminate) top layer, dispensed in a continuous roll, was treated with a polyurethane hot melt adhesive, Reichold 2U145, available from Reichold Chemicals, 2400 Ellis Rd, Durham, N.C. The adhesive was heated to 237 degrees F. and rolled onto the back of the HPL layer with a knurled roll.
4. The HPL was then mated to the PVC Plank, and IR heat was directed onto the face of the HPL. Temperature on the face of the PVC Plank was raised to 300° F.-330° F., which softens the HPL enough to allow shaping.

5. The HPL was shaped using rubber rollers onto the face of the PVC plank and down the beveled edges of the plank. As such, this wrapping process shaped the HPL to adhere to the topography of the plank onto which it is being affixed.

6. Water spray quickly lowered the temperature of the HPL/PVC Plank assembly to below 100° F. (94 F). Rubber rollers continued to hold the HPL onto the PVC surface while the assembly cooled further. This allowed the adhesive to cool and strengthen, thereby permanently affixing the HPL top layer to the PVC Plank lower layer.

7. Each individual plank assembly was then separated from the following planks with a force appropriate to make a sharp separation.

Post-Treatment:
Mechanical Post-Treatment

The HPL/PVC Plank assembly was then finished with tenon and edging procedures to cut the board ends square and trim the laminate overhang flush to the base plank.

Thermal Post-Treatment

Due to the uneven top-side heating of the HPL/PVC Plank assembly during shaping, the finished product can develop a "cup" distortion where the top ends of the plank come closer together. In order for the plank to lie flat, this must be countered with an opposing thermal treatment on the back side of the HPL/PVC Plank Assembly. Thermal treatment can be done in line by directly heating (in an upward direction) the bottom surface of the plank while the plank is undergoing the wrapping process.

For the specific HPL/PVC Plank geometry shown in FIG. 1, it has been found that by heating the back surface of the assembly to certain temperatures for certain times, the shape of the board can be controlled. In fact, the cupping can be corrected and a flat plank produced if the board is heated to 240-300 degrees F. for 20-45 seconds.

If the board is allowed to reside at higher temperatures for longer times, a "doming" can actually be induced into the board. So total control of the ultimate shape of the board can be achieved by appropriate selection of conditions.

The thermoplastic plank of the present invention was tested for properties and compared to commercially available Mannington laminate and wood flooring products.

The can drop test involved dropping a 2 lb can from 40 inches high, wherein 100% means a chip off of the product and 0% means no chip off.

Extrusion Plank Testing

| Test Designation | Mannington Product | | Extrusion Plank | |
| --- | --- | --- | --- | --- |
| | Laminate | Wood | Plank Only | With Overlay |
| Taber Abrasion, cycles to IP | 9880 | 125 | 5 mils @ 500 | 5590 |
| Can Drop, mils indent | | | | |
| MD, no feet | 30, 100% cat | 50, 100% cat | 5, 16% cat | 5, 0% cat |
| AMD, no feet | 30, 100% cat | 31, 100% cat | 1, 0% cat | 1, 0% cat |
| MD, with feet | — | — | 7, 28% cat | 5, 60% cat |
| AMD, with feet | | | 1, 0% cat | 0, 0% cat |
| Pneumatic Indent, mils indent | | | | |
| No feet | 0 | 3.6 | 0.2 | 0 |
| With feet | — | — | 0.2 | 0.2 |
| Two hour stain | | | | |
| KC-261 Asphalt (Sealer) | 0.5 | 0 | 3 | 0 |
| Shoe Polish | 0 | 1 | 0 | 0 |
| Oil Brown | 0.5 | 0 | 0 | 0 |
| Mustard | 0 | 0 | 0 | 0 |
| Chemlawn | 0 | 0 | 0 | 0 |
| Blue Sharpie | 0.5 | 0.5 | 0.5 | 0 |
| Iodine | 0 | 3 | 0 | 0 |
| Total Stain | 1.5 | 4.5 | 3.5 | 0 |
| Static Load, mils indent | | | | |
| No feet | 0 | 1 | 0 | 0 |
| With feet | — | — | 0 | 0 |
| Sliding Gouge MD, no feet | | | | |
| 250 psi | pass | pass | pass | pass |
| 300 psi | pass | fail | pass | pass |
| 350 psi | pass | fail | pass | pass |
| AMD, no feet | | | | |
| 250 psi | pass | pass | pass | pass |
| 300 psi | pass | fail | pass | pass |
| 350 psi | pass | fail | pass | pass |
| MD, with feet | | | | |
| 250 psi | — | — | pass | pass |
| 300 psi | — | — | pass | pass |
| 350 psi | — | — | pass | pass |

-continued

| Test Designation | Mannington Product | | Extrusion Plank | |
|---|---|---|---|---|
| | Laminate | Wood | Plank Only | With Overlay |
| AMD, with feet | | | | |
| 250 psi | — | — | pass | pass |
| 300 psi | — | — | pass | pass |
| 350 psi | — | — | pass | pass |
| Two hour boiling water | fail | fail | pass | pass |
| Dimensional Stability 120° F. | | | | |
| % wt. Change | | | | |
| % length change | | | | |
| % width change | | | | |
| Warping | | | | |
| 100% Relative Humidity | | | | |
| % wt. Change | | | | |
| % length change | | | | |
| % width change | | | | |
| Warping | | | | |
| Large ball impact, inches to failure | | | | |
| No feet | 14 | 10 | 32, no failure | 32, no failure |
| With feet | 32, with pad | — | 32, no failure | 32, no failure |
| Weathermeter | | | | |
| HPUV | | | | |
| Cigarette Burn, EN-438 | | | | |
| Moisture Resistance | | | | |

Example 2

A series of thermoplastic planks similar in design to the planks formed in Example 1 were connected together to create a flooring system. The splined system as set forth in FIG. 3 was used. In addition, a comparison was made with using no bonding agent and a flooring system using a bonding agent. The bonding agent, tetrahydrofuran (THF) was applied to all sides of the plank including the spline and grooves. When no THF was applied to the spline area, the bonding strength was an average of 1.73 pounds using the Instron test with the following parameters 50 pounds full scale for the chart paper, 0.5 jaw speed, 3 inch jaw distance, 1×5 sample, 156 mil spline thickness. When the same type of extrusion plank had THF applied to the spline area, after 4 hours curing, the bonding strength of the spline area was an average of 18.1 pounds and after 24 hours curing, the bonding strength of the spline area was 39.1 pounds. The ends of the extrusion plank were tested for bonding strength wherein the ends have no spline attachment and simply butted against each other. There was no bonding strength when no THF was present since there is nothing holding the edges of each plank together. When THF was applied to the edges after 4 hours cure, the bonding strength was over 100 pounds using a 100 pound scale, and after a 24 hour cure, the bonding strength was over 100 pounds using a 100 pound scale. When the test was repeated with a 152 mil spline with THF, using the INSTRON test, after 24 hour cure, the bonding strength was an average of 45.37 pounds.

A rolling secretary test using 165 pounds was then used. In this test, a 20 by 30 inch panel was used wherein a half of the panel was THF bounded over 24 hours and the other half of the panel had only splines holding the panels together. This panel was then laid on a carpet which caused movement up and down on the panel. The product with the 156 mils spline separated after 20 cycles and the other half of the product, which was sealed with THF, did not separate after 150 cycles. This was impressive considering the panel was not glued down to any surface.

A second panel was then made and placed on a sterling board with felt shim (0.26 inch) and placed in different places on the PVC board. This was done to cause unevenness in the subfloor. Upon doing the rolling secretary test again, the planks did not separate with the THF present.

Both products were then tested by placing them on towels and water was placed on the end cuts and the spline area. After 10 minutes, the water was wiped and the THF end cut area had very little penetration of water wherein the non-sealed area did show signs of leakage.

In the 75 pound slider test which was developed as a spline strength test, a 12 inch long spline was inserted into the tongue of a 12 inch plank and then a second plank was connected to the other side of the spline in order to connect two planks together. A hole was then drilled in the middle of one of the planks. With the two planks connected together, 75 pounds was placed on the plank without the hole and a 50 pound fish scale was hooked to the plank with the drilled hole and slowly pulled until the connected planks separated. With a 150 mil thick spline and a vertical gap thickness of PVC plank of approximately 154 mil on average, the product pulled apart from the spline after a static friction reading of about 25 pounds initial pull wherein the pull was done on a Lauan substrate. Using a spline that was 156 mil thick, the spline went in with some tapping and the test was done both on a Lauan and Sterling board substrate which gave different readings on the fish scale. With respect to the Sterling board substrate (static friction) of 40 pounds and (dynamic friction) of 35 pounds, the product did not pull apart. With respect to the Lauan (static friction) of 25 pounds and (dynamic friction) of 20 pounds, the product did not pull apart. A 159 mil spline was then used which was hard to install due to the thickness of the receiving tongue, in this test, Sterling (static friction) of 35 pounds and (dynamic friction) pulled apart but took some effort and the products did not move at all. With respect to the Lauan (static friction) of 35 pounds and (dynamic friction) of 30 pounds, the product slid but no separation.

In view of the above testing, these examples show that the addition of THF as a bonding agent provides significant strength advantages to the overall surface covering systems and also prevents water penetration to the subfloor especially at the edges where there is no spline system used.

Other embodiments of the present invention will be apparent to those skilled in the art from consideration of the specification and practice of the present invention disclosed herein. It is intended that the specification and examples be considered as exemplary only, with the true scope and spirit of the present invention be indicated by the following claims.

The embodiments of the present invention includes the following embodiments:

Embodiment 1

A thermoplastic laminate plank comprising:
a core comprising at least one thermoplastic material, wherein said core has a top surface and a bottom surface, and opposing sides;
a print layer affixed to said top surface of said core, wherein said print layer has a top surface and a bottom surface; and
a protective layer affixed to said top surface of said print layer, wherein said at least bottom surface of the core is thermally treated.

Embodiment 2

The plank of embodiment 1, further comprising an underlay layer located and affixed between said bottom surface of said print layer and said top surface of said core.

Embodiment 3

The plank of embodiment 1, wherein adhesive is present between said core and said print layer to affix said print layer to said core.

Embodiment 4

The plank of embodiment 2, wherein adhesive is present between said core and said underlay layer in order to affix said underlay layer to said core.

Embodiment 5

The plank of embodiment 4, wherein said adhesive comprises a hot melt glue.

Embodiment 6

The plank of embodiment 5, wherein said adhesive is a hot melt polyurethane glue.

Embodiment 7

The plank of embodiment 1, wherein said core is a rigid thermoplastic material.

Embodiment 8

The plank of embodiment 1, wherein said core comprises at least one thermoplastic material and at least one plasticizer.

Embodiment 9

The plank of embodiment 1, wherein said at least one plasticizer is present with the thermoplastic material in an amount of less than about 20% by weight of said core.

Embodiment 10

The plank of embodiment 1, wherein said at least one thermoplastic material is polyvinyl chloride.

Embodiment 11

The plank of embodiment 1, wherein said at least one thermoplastic material is a rigid polyvinyl chloride.

Embodiment 12

The plank of embodiment 1, wherein said core has a thickness of from about 5 mm to about 20 mm, a width of from about 2 cm to about 30 cm, and a length of from about 30 cm to about 130 cm.

Embodiment 13

The plank of embodiment 1, wherein said core has at least one cavity.

Embodiment 14

The plank of embodiment 1, wherein said core has a series of paralleled cavities which are separated by said thermoplastic material.

Embodiment 15

The plank of embodiment 14, wherein said series of cavities are rounded or rectangular is shape.

Embodiment 16

The plank of embodiment 14, wherein each cavities have dimensions of about 0.3 inch by about 0.3 inch and are separated by thermoplastic material having a thickness of from about 0.05 inch to about 0.07 inch.

Embodiment 17

The plank of embodiment 1, wherein said core has at least one groove located on a side of said core.

Embodiment 18

The plank of embodiment 17, wherein said core has a groove located on two sides of said core, wherein said sides are opposite to each other.

Embodiment 19

The plank of embodiment 17, wherein said grooves have teeth located on the upper surface, lower surface, or both upper and lower surfaces of said grooves.

Embodiment 20

The plank of embodiment 1, wherein two sides of said core are tapered or have beveled edges, wherein said sides are opposite to each other.

Embodiment 21

The plank of embodiment 1, wherein said bottom surface of said core has at least two bottom feet or a series of co-extruded polymeric strips to raise said core from a sub-floor or substrate surface.

Embodiment 22

The plank of embodiment 1, wherein said print layer comprises an aminoplast resin impregnated printed paper.

Embodiment 23

The plank of embodiment 22, further comprising a printed design.

Embodiment 24

The plank of embodiment 22, wherein said aminoplast resin is a melamine resin, a phenolic resin, or an urea resin, or combinations thereof.

Embodiment 25

The plank of embodiment 22, wherein said aminoplast resin is a urea formaldehyde and melamine formaldehyde blend.

Embodiment 26

The plank of embodiment 1, wherein said overlay comprises an aminoplast resin impregnated overlay paper and aluminum oxide imbedded on the top surface of said paper.

Embodiment 27

The plank of embodiment 1, wherein said overlay comprises an aminoplast resin impregnated overlay paper.

Embodiment 28

The plank of embodiment 2, wherein said underlay comprises an aminoplast resin impregnated paper.

Embodiment 29

The plank of embodiment 28, wherein said underlay comprises Kraft paper impregnated with an aminoplast resin.

Embodiment 30

A method of making a thermoplastic laminate plank of embodiment 1, comprising:
  extruding said at least one thermoplastic material into the shape of said core;
  affixing a laminate on said core, wherein said laminate comprises an overlay affixed to said top surface of said print layer and optionally an underlay layer affixed to said bottom surface of said print layer.

Embodiment 31

A thermoplastic plank comprising:
  a core comprising at least one thermoplastic material wherein said core has a top surface, a bottom surface, and opposing sides;
  a printed design on said top surface of the plank;
  at least one protective coating on top of said printed design.

Embodiment 32

The thermoplastic plank of embodiment 31, wherein said protective coating comprises a polyurethane type coating with or without wear resistant particles in the coating.

Embodiment 33

The thermoplastic plank of embodiment 31, wherein said thermoplastic material comprises polyvinyl chloride type polymers.

Embodiment 34

A method of making the thermoplastic plank of embodiment 31 comprising extruding at least one thermoplastic material into the shape of a core;
  printing a design directly on the top surface of the plank; and
  applying a protective coating on top of the printed design and curing the coating.

Embodiment 35

A thermoplastic flooring plank comprising:
  a core comprising at least one thermoplastic material, wherein said core has a top surface, a bottom surface, and opposing sides;
  a thermoplastic layer located on said top surface of said core wherein said layer comprises at least one thermoplastic material with at least one pigmented compound.

Embodiment 36

A method of making the thermoplastic flooring plank of embodiment 35, comprising:
  extruding at least one thermoplastic material into the shape of a core;
  and extruding simultaneously or subsequently a layer comprising at least one thermoplastic material with at least one pigmented compound wherein said layer is extruded on the top surface of said core.

Embodiment 37

The thermoplastic laminate of embodiment 1, wherein said thermoplastic material comprises at least one thermoplastic resin, at least one processing aid, at least one impact modifier, at least one lubricant, and at least one stabilizer.

Embodiment 38

The thermoplastic laminate of embodiment 37, wherein said thermoplastic material further comprises at least one pigment.

Embodiment 39

A surface covering comprising a plurality of thermoplastic laminate planks of embodiment 1 joined together.

Embodiment 40

The surface covering of embodiment 39, wherein said surface covering is a floor covering that is a floating floor installation.

Embodiment 41

A floor covering comprising a plurality of thermoplastic laminate planks, wherein said floor covering is a floating surface and wherein said thermoplastic laminate plank comprises: a core comprising at least one thermoplastic material, wherein each core has a top surface and a bottom surface, and opposing sides; a print layer affixed to said top surface of said core, wherein said print layer has a top surface and a bottom surface; and a protective layer affixed to said top surface of said print layer.

Embodiment 42

The surface covering of embodiment 41, wherein at least a portion of said thermoplastic laminate planks are joined together by splines.

Embodiment 43

The surface covering of embodiment 41, wherein at least a portion of said thermoplastic laminate planks are joined together by a bonding agent.

Embodiment 44

The surface covering of embodiment 43, wherein said bonding agent is tetrahydrofuran, methylene chloride, a ketone, or combinations thereof.

Embodiment 45

A thermoplastic laminate plank comprising:
a core comprising at least one thermoplastic material, wherein said core has a top surface and a bottom surface, and opposing sides;
a print layer affixed to said top surface of said core, wherein said print layer has a top surface and a bottom surface; and
a protective layer affixed to said top surface of said print layer, with the proviso that no backing layer is located adjacent the bottom surface of said core.

Embodiment 46

The thermoplastic laminate plank of embodiment 45, wherein each core has a series of parallel cavities which are separated by said thermoplastic material, wherein the thickness of the thermoplastic material separating the outermost cavities is thicker then the thickness of the thermoplastic material separating the innermost cavities.

The invention claimed is:

1. A thermoplastic laminate plank, comprising:
a core comprising at least one thermoplastic material, an internal lubricant, and a filler, wherein said core has top surface and a bottom surface, and opposing sides;
a print layer affixed directly to said top surface of said core, wherein said print layer has a top surface and a bottom surface, wherein the print layer is a thermoplastic film with a printed design; and
a protective layer affixed to said top surface of said print layer,
wherein said core has a tongue design on at least one edge and a groove design on at least an opposite edge,
wherein said core is extruded and said filler in said core consists of calcium carbonate,
wherein the core has a cellular foam structure,
wherein the thermoplastic material is polyvinyl chloride comprising a suspension-grade homopolymer resin,
wherein said internal lubricant is a calcium salt of stearic acid or a zinc salt of stearic acid, and
wherein said core comprises cavities that each have a height dimension of about 3 mm to about 16 mm and a width dimension of about 6 mm to about 20 mm, the cavities being separated by said thermoplastic material.

2. A thermoplastic laminate plank, comprising:
a core comprising at least one thermoplastic material and wood flour, wherein said core has top surface and a bottom surface, and opposing sides;
a digital printed design on said top surface of the core;
at least one protective coating on top of said digital printed design,
wherein said core has a tongue design on at least one edge and a groove design on at least an opposite edge,
wherein the core has a cellular foam structure,
wherein the thermoplastic material is polyvinyl chloride comprising a suspension-grade homopolymer resin,
wherein said suspension-grade homopolymer resin comprises resin particles that possess a uniform porosity, and
wherein said core comprises cavities that each have a height dimension of about 3 mm to about 16 mm and a width dimension of about 6 mm to about 20 mm, the cavities being separated by said thermoplastic material.

3. The thermoplastic plank according to claim 2, wherein the protective coating is a polyurethane coating.

4. The thermoplastic plank according to claim 1, wherein the thermoplastic film possesses a thickness of between 10 mils and 20 mils.

* * * * *